(12) United States Patent
Graham et al.

(10) Patent No.: US 12,146,454 B2
(45) Date of Patent: Nov. 19, 2024

(54) MULTI-VOLUME ACOUSTIC RESONATOR FOR ROCKET ENGINE

(71) Applicant: Blue Origin, LLC, Kent, WA (US)

(72) Inventors: Owen Stewart Graham, Wales, WI (US); Stephen Wuest, Renton, WA (US); Nicholas James Keleshian, Mercer Island, WA (US); Warren Godwin Lamont, Seattle, WA (US)

(73) Assignee: Blue Origin, LLC, Kent, WA (US)

( * ) Notice: Subject to any disclaimer, the term of this patent is extended or adjusted under 35 U.S.C. 154(b) by 0 days.

(21) Appl. No.: 18/540,064

(22) Filed: Dec. 14, 2023

(65) Prior Publication Data

US 2024/0191676 A1 Jun. 13, 2024

Related U.S. Application Data

(63) Continuation of application No. 17/843,484, filed on Jun. 17, 2022, now Pat. No. 11,867,139.

(51) Int. Cl.
*F02K 9/62* (2006.01)
*F23R 3/00* (2006.01)

(52) U.S. Cl.
CPC ............... *F02K 9/62* (2013.01); *F23R 3/002* (2013.01); *F23R 2900/00014* (2013.01)

(58) Field of Classification Search
CPC .. F23R 2900/00014; F23R 3/002; F23R 3/16; F23M 20/005; F05D 2260/96; F02C 7/24; F02K 1/34; F02K 9/62; F02K 1/827
See application file for complete search history.

(56) References Cited

U.S. PATENT DOCUMENTS 6,981,358 B2 * 1/2006 Bellucci ............... F23M 20/005
60/725
9,514,734 B1 12/2016 Jones et al.
(Continued)

FOREIGN PATENT DOCUMENTS

CN 102933462 A * 2/2013 ............. B64D 33/02
CN 115265293 A * 11/2022 ............. F42B 15/36
(Continued)

OTHER PUBLICATIONS

De Bedout, J.M. et al., "Adaptive-passive Noise Control With Self-tuning Helmholtz Resonators," Master Thesis, Purdue University, May 1996, 94 pp.
(Continued)

*Primary Examiner* — Craig Kim
(74) *Attorney, Agent, or Firm* — Knobbe, Martens, Olson & Bear, LLP

(57) ABSTRACT

A modular damper plug forming a multi-volume acoustic resonator in an acoustic liner of a rocket engine is provided. In one aspect, the damper plug includes a main body including a top surface spaced from a bottom surface by a first height, a left surface spaced from a right surface by a width, and an exterior surface spaced from an interior surface by a length. A chamber within the main body extends along a part of the height, a part of the width, and a part of the length, and communicates with the top surface through an opening. The chamber also communicates with the interior surface through one or more ducts. The main body is sized and shaped to be received in any one of a plurality of cavities in the acoustic liner. The chamber includes an upstream volume of the acoustic resonator, and the one or more ducts communicate with a downstream volume of the acoustic resonator when the damper plug is received in any one of the plurality of cavities.

20 Claims, 11 Drawing Sheets

(56) References Cited

U.S. PATENT DOCUMENTS

| | | | |
|---|---|---|---|
| 10,670,271 B2 * | 6/2020 | Abu-Irshaid | F23R 3/002 |
| 10,941,939 B2 * | 3/2021 | Graham | F23R 3/28 |
| 11,867,139 B1 * | 1/2024 | Graham | F02K 9/62 |
| 2005/0013457 A1 | 1/2005 | Sheplak et al. | |
| 2007/0125089 A1 * | 6/2007 | Sattinger | F23M 20/005 |
| | | | 60/725 |
| 2013/0251510 A1 | 9/2013 | Runyan et al. | |
| 2016/0153661 A1 * | 6/2016 | Bothien | F23R 3/16 |
| | | | 60/725 |
| 2018/0363589 A1 * | 12/2018 | Isono | F23R 7/00 |
| 2019/0270504 A1 | 9/2019 | Cedar et al. | |
| 2021/0256948 A1 * | 8/2021 | Tomimatsu | G10K 11/172 |
| 2022/0349346 A1 * | 11/2022 | Shiraishi | F23R 3/005 |
| 2022/0373180 A1 * | 11/2022 | Akamatsu | F23R 3/002 |
| 2023/0407819 A1 * | 12/2023 | Graham | F02K 9/62 |

FOREIGN PATENT DOCUMENTS

| | | | | |
|---|---|---|---|---|
| CN | 218584902 U | * | 3/2023 | |
| CN | 110877624 B | * | 4/2024 | B61F 5/12 |
| EP | 2187125 A1 | * | 5/2010 | F23M 20/005 |
| EP | 2372697 A1 | | 10/2011 | |
| EP | 2557282 B1 | | 7/2015 | |
| EP | 3869499 A1 | | 8/2021 | |
| JP | 2017015972 A | | 1/2017 | |
| WO | WO-2017077874 A1 | * | 5/2017 | F02K 9/52 |
| WO | WO 2018/099802 A1 | | 6/2018 | |
| WO | WO 2019/182213 A1 | | 9/2019 | |
| WO | WO-2019166400 A1 | * | 9/2019 | F15D 1/0025 |

OTHER PUBLICATIONS

Douglass et al., "Liquid Rocket Engine Combustion Stabilization Devices", NASA Space Vehicle Design Criteria (Chemical Propulsion), NASA SP 8113, Nov. 1974, 127 pp.

Zhao et al., "A review of acoustic dampers applied to combustion chambers in aerospace industry", Progress in Aerospace Sciences 74, Dec. 2014, pp. 114-130.

* cited by examiner

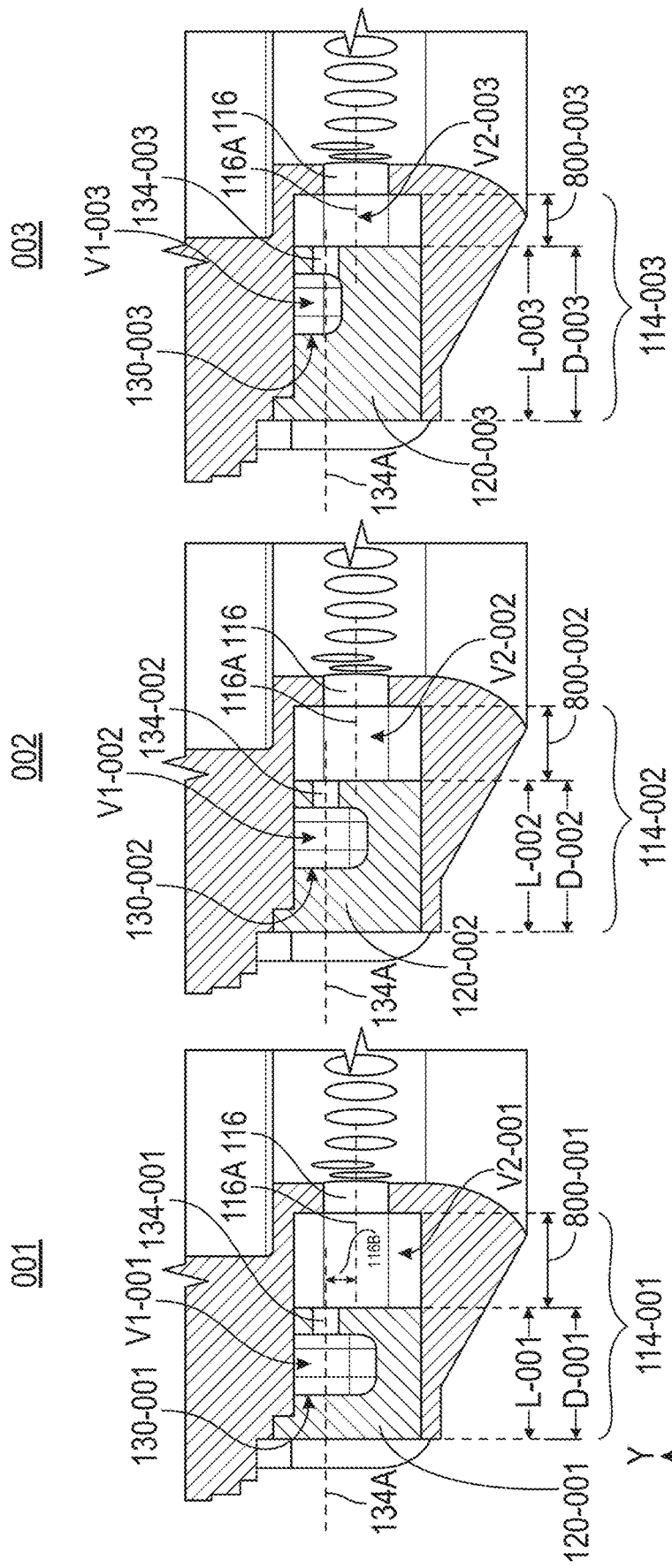

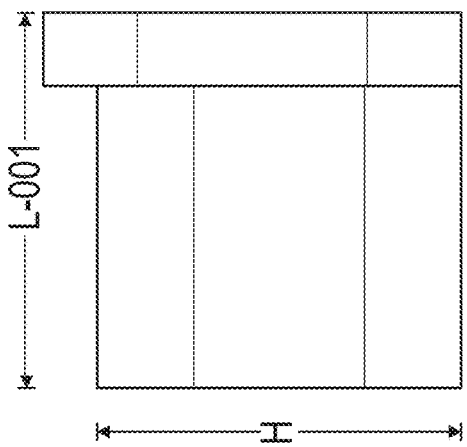
FIG. 7E
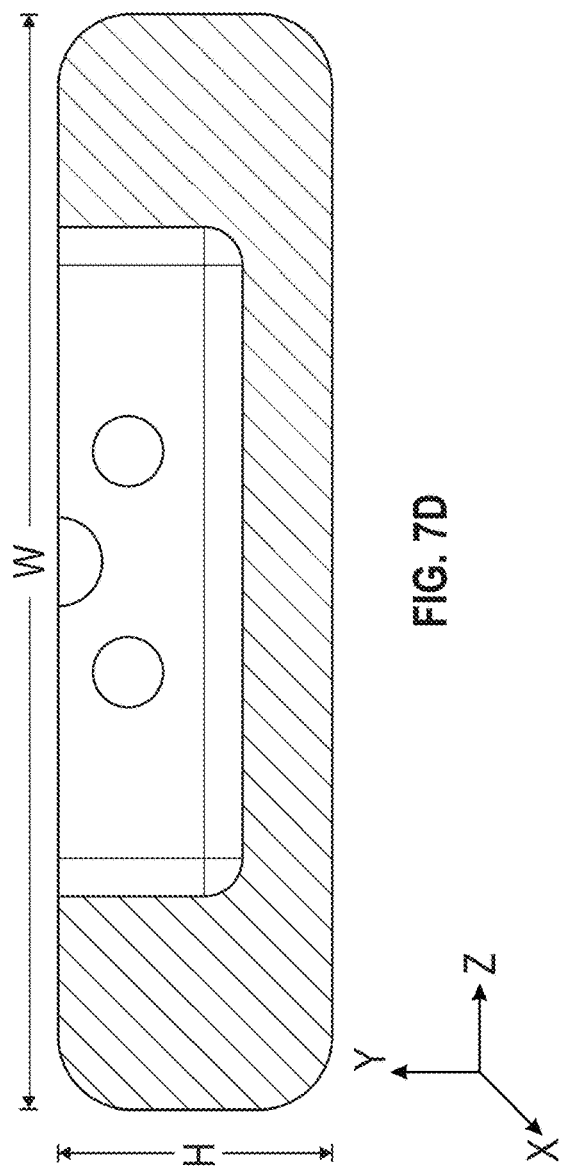
FIG. 7D
| Model Number | Exterior Length (L-001,L-002, L-003) inches | Indented Portion |
|---|---|---|
| 120-001 | 0.48 - 0.52 | Yes |
| 120-002 | 0.58 - 0.62 | No |
| 120-003 | 0.68 - 0.72 | No |
FIG. 7F
| | Model 120-001 | Model 120-002 | Model 120-003 |
|---|---|---|---|
| Upstream orifice (qty 1) | 0.06 inch diameter | | |
| Upstream volume (V1) | 0.09 inch³ | 0.061 inch³ | 0.032 inch³ |
| Intermediate orifice (qty 2) | 2 * 0.21 - 0.33 inch diameter | | |
| Downstream volume (V2) | 0.374 inch³ | 0.295 inch³ | 0.215 inch³ |
| Downstream orifice (qty 4) | 4 * 0.3 inch diameter | | |
FIG. 7G

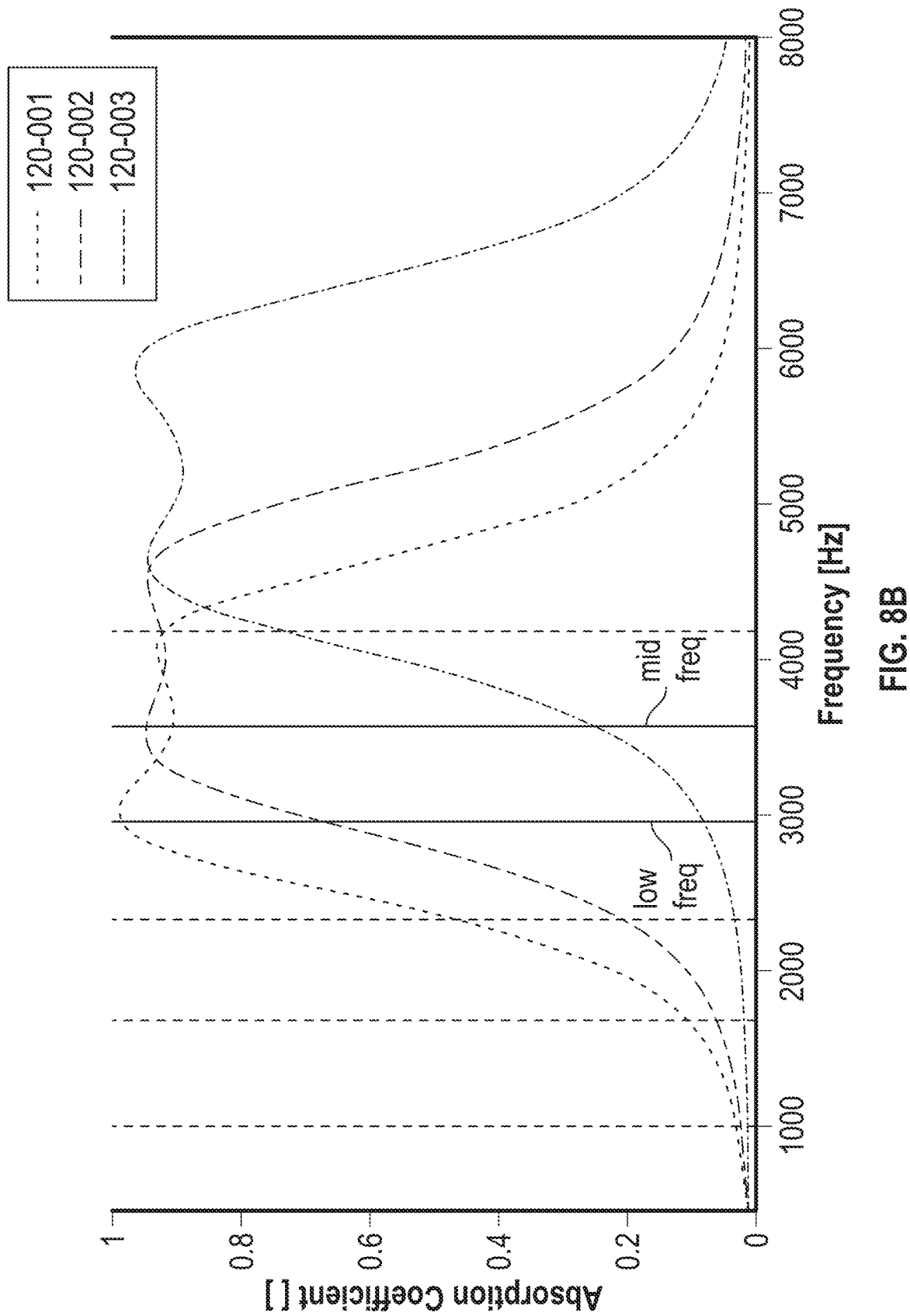

MULTI-VOLUME ACOUSTIC RESONATOR FOR ROCKET ENGINE

CROSS-REFERENCE TO RELATED APPLICATION

This application is a continuation of U.S. patent application Ser. No. 17/843,484, filed on Jun. 17, 2022, and titled "MULTI-VOLUME ACOUSTIC RESONATOR FOR ROCKET ENGINE", the entire content of which is incorporated by reference herein and forms a part of this specification for all purposes.

BACKGROUND

Technological Field

The present disclosure relates generally to acoustic dampers, in particular to a multi-volume acoustic damper for rocket engines.

Description of the Related Art

Rocket engines, particularly liquid rocket engines, operate by mixing and burning an oxidizer, such as liquid oxygen, and fuel in a combustion chamber. The combustion produces a great amount of exhaust gas at a high temperature and a high pressure, which can lead to instability in the rocket engine that is of an acoustic nature. The performance of the rocket engine is highly affected by such thermoacoustic instability, and therefore, continuous effort has been made to dampen and minimize this instability. One of the commonly-implemented methods is to use a Helmholtz resonator to attenuate the thermoacoustic instability, based on the theory that acoustic energy traveling into a Helmholtz resonator is dissipated at targeted frequencies by the specific combinations of volumes, neck areas and lengths. This method can reduce thermoacoustic combustion instability; however, current implementations of Helmholtz resonators have a single cavity, which limits the resonators effectiveness to a narrow range of frequencies.

SUMMARY

Embodiments disclosed herein each have several aspects no single one of which is solely responsible for the present disclosure's desirable attributes. Without limiting the scope of the present disclosure, its more prominent features will now be briefly discussed. After considering this discussion, and particularly after reading the section entitled "Detailed Description" one will understand how the features of the embodiments described herein provide advantages over existing approaches to dampening combustion instability in rocket engines.

An acoustic resonator having multiple cavity volumes for rocket engines is described herein for reducing thermoacoustic combustion instability while increasing engine life, efficiency, and operability. An acoustic cavity or acoustic resonator may be connected to a combustor or manifold by one or more orifices. The acoustic resonator may include two or more inner volumes which can be interconnected by one or more ducts. The inner volume sizes and duct size, length, and number may be varied to achieve stabilization over a wide range of frequencies. The acoustic resonator may be unpurged/purged by a secondary flow of fuel/oxidizer/other gas, with a variable purge flow rate to control cavity conditions and damping effectiveness.

In one aspect, a modular damper plug is configured to be received in an acoustic liner of a rocket engine to form an acoustic resonator. The damper plug may include: a main body including a top surface spaced from a bottom surface by a first height, a left surface spaced from a right surface by a width, and an exterior surface spaced from an interior surface by a length; and a chamber within the main body extending along a part of the height, a part of the width, and a part of the length, the chamber communicating with the top surface through an opening, the chamber communicating with the interior surface through one or more ducts. The main body is sized and shaped to be received in any one of a plurality of cavities in the acoustic liner. The chamber includes an upstream volume of the acoustic resonator, and the one or more ducts communicate with a downstream volume of the acoustic resonator when the damper plug is received in any one of the plurality of cavities.

The damper plug may transmit fuel entering the opening in the top surface through the one or more ducts into the downstream volume of the acoustic resonator. The modular damper plug may further include two ducts having a circular cross-section. The opening in the top surface may include an indented portion located opposite the interior surface. The indented portion may have a semi-circular cross-section. In addition, the exterior surface may include a flange, a top surface of the flange spaced from the bottom surface of the damper plug by a second height that is greater than the first height. The interior surface may be in the shape of a first rectangle with rounded corners having a first area. The exterior surface may be in the shape of a second rectangle with rounded corners having a second area greater than the first area.

In another aspect, an acoustic liner configured to control combustion instability in a rocket engine is provided. The acoustic liner can include a plurality of identical or substantially identical cavities formed within the liner in a ring. Each cavity can include an exterior opening in an exterior surface of the liner, and each cavity can open into an interior surface of the liner through a plurality of orifices. A first modular damper plug can be received in a first cavity of the plurality of cavities to form a first acoustic resonator having a first downstream volume. The acoustic liner can also include a second modular damper plug having a length that is greater than the length of the first modular damper plug. The second modular damper plug can be received in a second cavity of the plurality of cavities to form a second acoustic resonator having a second downstream volume that is less than the first downstream volume of the first acoustic resonator.

The acoustic liner may further include a third modular damper plug which has a length that is greater than the length of the second modular damper plug. The third modular damper plug may be received in a third cavity of the plurality of cavities to form a third acoustic resonator having a third downstream volume that is less than the second downstream volume of the second acoustic resonator. The volume of the chamber of the first modular damper plug may be greater than the volume of the chamber of the second modular damper plug, and the volume of the chamber of the second modular damper plug may be greater than the volume of the chamber of the third modular damper plug. The first acoustic resonator may be configured to target a first range of frequencies, the second acoustic resonator may be configured to target a second range of frequencies that at least partially overlaps the first range of frequencies, and the third acoustic resonator may be configured to target a third range of frequencies that at least partially overlaps the second range of frequencies. The first acoustic resonator may have an upstream volume of about 0.090 in3 and a downstream volume of about 0.37 in$^3$, the second acoustic resonator may have an upstream volume of about 0.061 in$^3$ and a downstream volume of about 0.29 in$^3$, and the third acoustic resonator may have an upstream volume of about 0.032 in$^3$ and a downstream volume of about 0.22 in$^3$. The exterior opening of the first cavity may include a groove sized and shaped to receive the flange of the exterior surface of the first modular damper plug.

In addition, the acoustic liner according to various embodiments may include a plurality of purge channels, each purge channel communicating with a manifold of the rocket engine and a cavity of the plurality of cavities. The opening in the top surface of the first modular damper plug may include an indented portion located opposite the interior surface. The indented portion may be in direct fluidic communication with a first purge channel of the plurality of purge channels. The opening in the top surface of the second modular damper plug may not include an indented portion located opposite the interior surface. The chamber of the second modular plug may be in direct fluidic communication with a second, different purge channel of the plurality of purge channels. Further, axes of the one or more ducts of the first modular damper plug may be spaced from the axes of the plurality of orifices by a distance measured along the longitudinal axis of the acoustic liner. The plurality of cavities may be thirty-two cavities. First modular damper plugs may be received in eight of the cavities, second modular damper plugs may be received in sixteen of the cavities, and third modular damper plugs may be received in eight of the cavities. The plurality of orifices may comprise four orifices.

BRIEF DESCRIPTION OF THE DRAWINGS

Features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings. In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the present disclosure. It will be readily understood that the aspects of the present disclosure, as generally described herein, and illustrated in the figures, can be arranged, substituted, combined, and designed in a wide variety of different configurations, all of which are explicitly contemplated and make part of this disclosure.

FIGS. 7A, 7B, and 7C illustrate three different models of modular damper plugs inserted in three cavities of an acoustic liner to form three multi-volume acoustic resonators achieving different target frequencies according to an embodiment of the present disclosure;

FIGS. 7D and 7E illustrate features of the example modular damper plug of FIG. 7A, and FIG. 7F is a table illustrating features of the example modular damper plugs of FIGS. 7A, 7B, and 7C, respectively;

FIG. 7G is a table illustrating additional dimensions and features of the example modular damper plugs of FIGS. 7A, 7B, and 7C;

FIG. 8B is a graph illustrating properties of a broadband closed cavity ring (CCR) implementing three different models of modular damper plugs according to the present disclosure.

Figure 1:
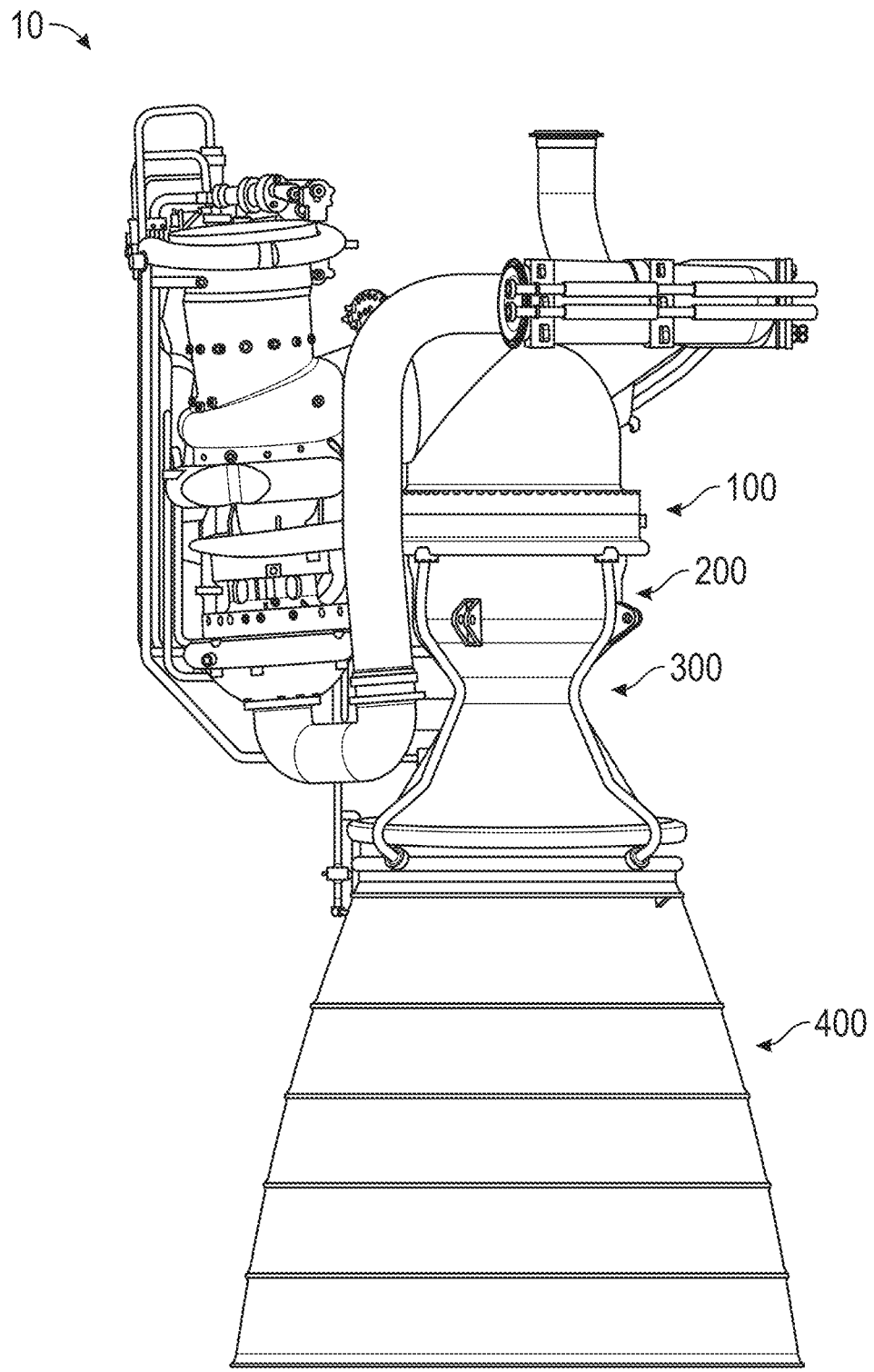
FIG. 1 illustrates an example of a liquid rocket engine.

Various features illustrated in the drawings may not be drawn to scale. Accordingly, the dimensions of the various features may be arbitrarily expanded or reduced for clarity. In addition, some of the drawings may be simplified for clarity. Various embodiments of the present disclosure will now be described with reference to the figures, wherein like numerals refer to like elements throughout. The terminology used herein is not intended to be interpreted in any limited or restrictive manner.

DETAILED DESCRIPTION

A modular damper plug for a rocket engine described herein provides solutions to problems with existing acoustic resonators and various advantages over existing devices. Rocket engines typically undergo combustion instabilities due to feedback between unsteady combustion and pressure waves. Such combustion instabilities create undesirable/unexpected issues such as mechanical vibration, liner damage, and ultimately engine loss. Accordingly, acoustic resonators (also known as acoustic cavities) have been used to reduce the resonant response of the combustor. One type of existing acoustic resonator is a Helmholtz resonator, which consists of a small passage (also known as a neck) connecting the combustion chamber to a resonator cavity. The Helmholtz resonator theory has been implemented in which dimensions of a single resonator cavity are large compared with the passage width but small compared with a wavelength. Rocket engines generally include an acoustic liner (also referred to as a cavity ring) disposed around the combustion chamber and designed to implement a plurality of resonators therein. The plurality of resonators generally have a single resonator cavity connected to the combustor by a single duct (or slot) and may be arranged along the acoustic liner. However, the single-cavity, single-slot Helmholtz resonators are characterized by a narrow absorption curve, such as described in more detail below and illustrated with reference to FIG. 8A.

A modular damper plug according to the present disclosure forms a multi-volume acoustic resonator that can be advantageously tuned to dampen pressure waves across a wide range of frequencies. Acoustic resonators according to the present disclosure include multiple volumes connected to each other and to a combustor via multiple necks. Advantageously, an acoustic liner implementing a plurality of modular damper plugs according to the present disclosure is characterized by a much wider absorption band across a wider frequency range than can be achieved with an acoustic liner implementing a plurality of single-cavity, single-slot resonators. In addition, the modular damper plug according to the present disclosure can be received in any one of a plurality of cavities in an acoustic liner to form a multi-volume acoustic resonator having specifically-selected properties. An acoustic liner including a plurality of modular damper plugs according to the present disclosure can thus be advantageously designed to achieve particular design goals, for example, dampening specific target frequencies for a specific engine. In one non-limiting example, two, three, or more different models of modular damper plugs are received in a plurality of cavities of an acoustic liner, each model of plug having properties to target particular frequencies, or ranges of frequencies. The frequency-targeting properties of damper plugs according to the present disclosure can be adjusted, or tuned, by changing a volume and/or location of a chamber within the plug (thereby changing the acoustic resonator's first, upstream volume); and/or changing the length (or insertion depth) of the damper plug within a respective cavity of the liner (thereby changing the acoustic resonator's second, downstream volume); and/or changing the number and physical dimensions of ducts communicating gas and fluid from the upstream volume to the downstream volume. In one non-limiting example described in detail below, an acoustic liner includes a plurality of damper plugs of a first model, a plurality of damper plugs of a second model, and a plurality of damper plugs of a third model, where the upstream volume of the damper plug varies between each model and the length of the damper plug varies between each model (such that the downstream volume of the respective acoustic resonator also varies). The different models of damper plugs thus form a plurality of multi-volume acoustic resonators that, collectively, cover a broader range of frequencies than prior implementations.

Advantageously, damper plugs according to embodiments of the present disclosure are modular, such that any damper plug of a plurality of damper plugs is configured to be received in any one of a plurality of identical or substantially identical cavities formed within the acoustic liner, independent of the frequency-targeting properties of the individual damper plug. As will be described in detail below, the shape and dimensions of exterior surfaces of the modular damper plug can be substantially the same for all plugs, across all models (with the exception of the exterior length, which can vary between models). Accordingly, in the above non-limiting example, any one of the plurality of damper plugs of the first model, any one of the plurality of damper plugs of the second model, and any one of the plurality of damper plugs of the third model can be received in any one of a plurality of cavities of the acoustic liner.

The modular damper plugs of the present disclosure form multi-volume acoustic resonators having a first, upstream volume, and a second, downstream volume. As a result, an acoustic resonator including a single damper plug according to the present disclosure can target more than one frequency or, alternatively, be effective over a broad range of frequencies centered on a specific frequency. Advantageously, this can make the multi-volume acoustic resonator less susceptible to changes in operating conditions and manufacturing variations. Moreover, each frequency can be independently targeted for dampening, because the first, upstream volume and the second, downstream volume can be independently adjusted. The upstream volume of the resonator can be independently adjusted by changing the volume of the chamber within the main body of the plug, while maintaining the exterior shape and dimensions of the main body of the plug common across all plugs. The downstream volume of the resonator can be independently adjusted by changing the exterior length of the main body of the plug, while maintaining all other exterior shape and dimensions of the main body common across all plugs. This ability to independently target multiple frequencies using a single modularly-shaped damper plug offers greater flexibility and range to reduce combustion instability, while also using a smaller amount of overall cavity space.

The frequency-targeting properties of an individual damper plug can be optimized using additional independently-adjustable parameters: the number and physical dimensions of ducts (or necks) communicating gas between the first, upstream volume and the second, downstream volume of the resonator. In one non-limiting embodiment, a modular damper plug according to the present disclosure includes two ducts, each duct having a length and diameter selected to achieve particular dampening characteristics. Embodiments of the modular damper plug according to the present disclosure having multiple ducts can increase the viscous and inductive damping of the corresponding acoustic resonator relative to conventional designs.

It will be understood that embodiments of multi-volume acoustic resonators according to the present disclosure are not limited to specific implementations described herein. As an example, the present disclosure is not limited to an acoustic liner including damper plugs of differing models, and can include an acoustic liner including identical damper plugs received in each of a plurality of cavities. Advantageously, embodiments of an acoustic liner including identical damper plugs can still target multiple frequencies, because damper plugs according to the present disclosure form multi-volume acoustic resonators. As another example, the present disclosure is not limited to an acoustic liner including identical or substantially identical cavities, and can include an acoustic liner including cavities of different dimensions. As still another example, a damper plug according to the present disclosure need not be modular or configured to be received in any one of a plurality of identical cavities of an acoustic liner. Accordingly, although embodiments of the present disclosure are described with reference to a modular damper plug, it will be understood that the present disclosure includes non-modular or non-uniform damper plugs. As still a further example, the present disclosure is not limited to the specific dimensions, shapes, or configurations of example damper plugs described herein, and can include any damper plug suitably implemented in a cavity to form a multi-volume acoustic resonator. As yet another example, multi-volume acoustic resonators according to the present disclosure are not limited to resonators having four orifices and/or two ducts. Advantageously, multi-volume acoustic resonators according to the present disclosure can include 2, 3, 5, or more orifices and/or more than 2 ducts. As still a further example, multi-volume acoustic resonators according to the present disclosure are not limited to resonators having two interconnected volumes (as described with reference to the below examples). Advantageously, multi-volume acoustic resonators according to the present disclosure can include three or more interconnected volumes. The above-described examples are provided by way of explanation and not limitation.

Example Damper Plug

An example damper plug according to the present disclosure implemented in an acoustic liner of a rocket engine will now be described. The damper plug according to the present disclosure allows a single multi-volume acoustic resonator to target multiple frequencies and/or a broad band of frequencies. In addition, the damper plug according to the present disclosure can include more than one duct, each duct having physical dimensions selected to increase the viscous and inductive damping of the acoustic resonator relative to conventional designs. It will be understood that damper plugs according to the present disclosure are not limited to acoustic resonators in rocket engines, and can be suitably implemented in a number of other contexts.

Figure 3A:
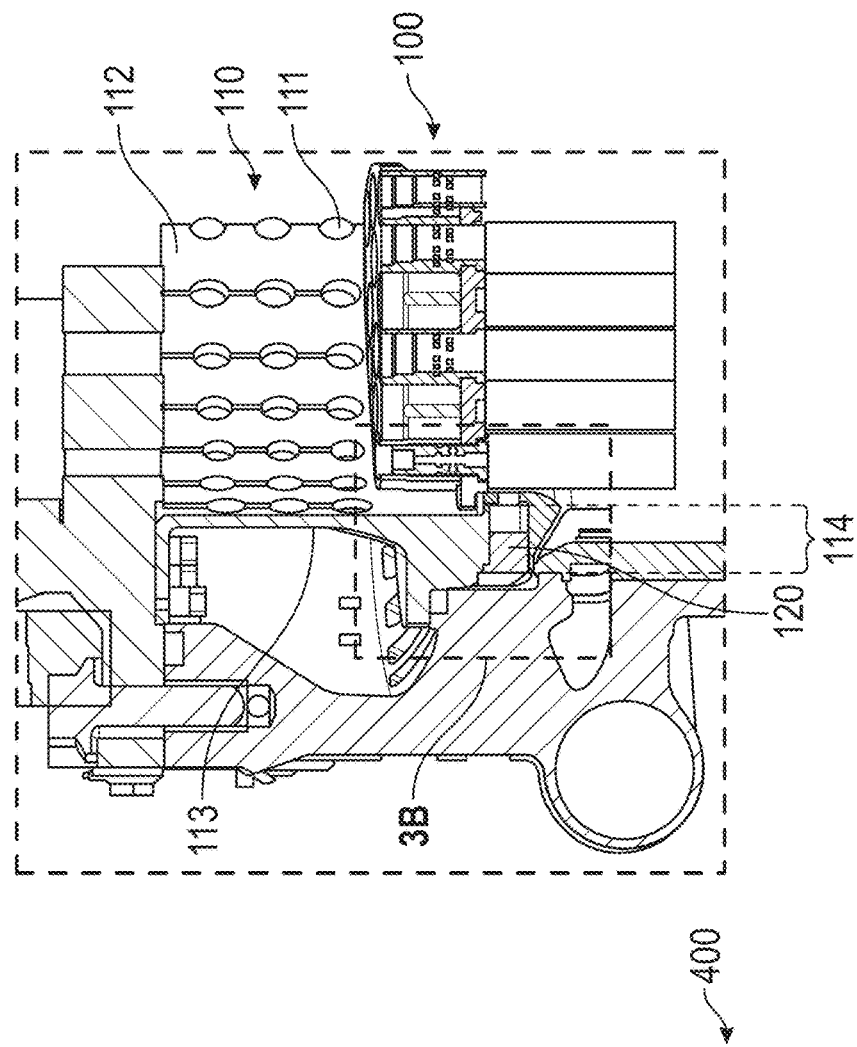
FIG. 3A illustrates an enlarged view of section 3A of FIG. 2 with a multi-volume acoustic resonator according to the present disclosure.
Figure 2:
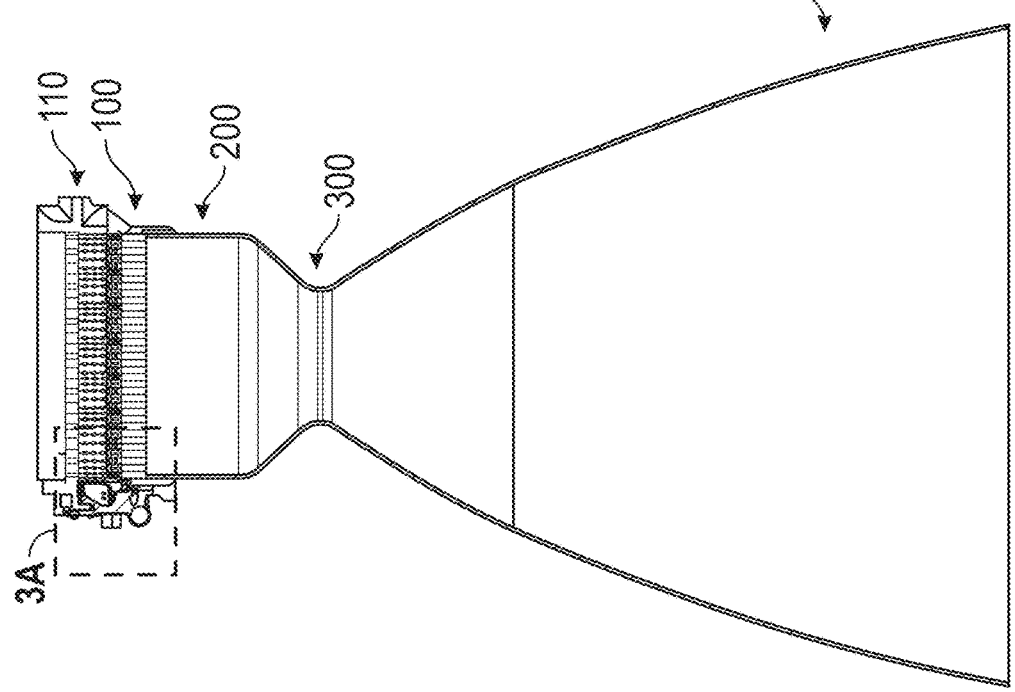
FIG. 2 illustrates a cross-sectional view of the liquid rocket engine of FIG. 1 including multi-volume acoustic resonators according to an embodiment of the present disclosure.
Figure 3B:
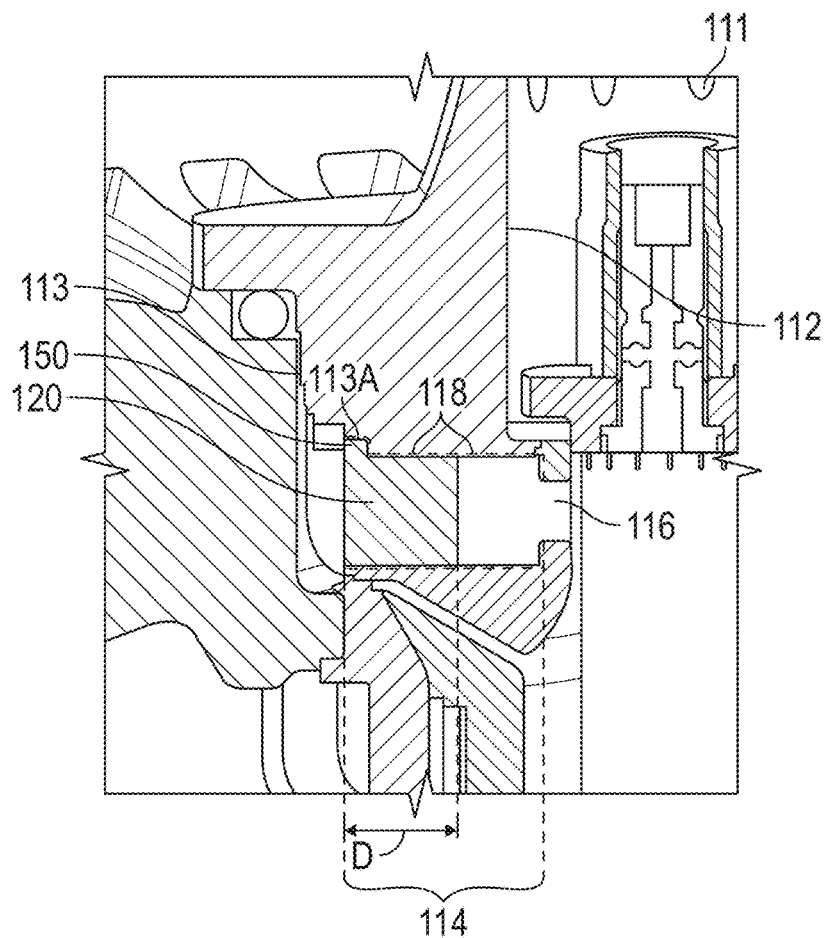
FIG. 3B illustrates an enlarged view of section 3B of FIG. 3A.

FIG. 1 illustrates an example liquid rocket engine 10 in which a plurality of acoustic resonators according to the present disclosure are implemented. FIG. 2 illustrates a cross-sectional view of the liquid rocket engine 10 including acoustic resonators according to the present disclosure. FIG. 3A illustrates an enlarged view of section 3A of FIG. 2 with a multi-volume acoustic resonator according to the present disclosure. FIG. 3B illustrates a close-up view of section 3B of FIG. 3A. The liquid rocket engine 10 includes at least one injector 100, a combustor 200, a throat 300, and a nozzle 400. The at least one injector 100 serves primarily to control the flow of liquid propellants to achieve a desired mixture of fuel and gas such as oxidizer. As the liquid propellant is introduced into the combustor 200 and atomized, it is then ignited, creating a rapid expansion of gases which are emitted through the nozzle 400, generating thrust to propel a spacecraft, aircraft, missile, or other vehicle. In one non-limiting embodiment, the liquid rocket engine 10 is a BE-4 engine by Blue Origin®, an oxygen-rich liquified-natural-gas fueled staged-combustion rocket engine.

The liquid rocket engine 10 further includes an acoustic liner 110, as shown in FIG. 2, through which energy is dissipated. The acoustic liner 110 may be fitted inside the combustor 200 adjacent the at least one injector 100. Referring now to FIG. 3A, the acoustic liner 110 according to the present disclosure may be formed with a plurality of holes 111 allowing communication between an inner side 112 and an outer side 113 of the acoustic liner 110, so as to dissipate the gas and any backflow of the liquid mixture within the combustor 200.

The acoustic liner 110 includes one or more acoustic resonators 114 in accordance with embodiments of the present disclosure. As shown in FIG. 3B, the acoustic resonators 114 communicate with an inner side of the acoustic liner 110 through a plurality of orifices 116. More specifically, each acoustic resonator 114 includes a cavity 118 (inside the dotted line) that communicates with the inner side 112 of the acoustic liner 110 through a plurality of orifices 116 that are aligned with and axially inboard of the cavity 118. In this non-limiting embodiment, the cavity 118 of the acoustic resonator 114 communicates with four orifices 116 (one of which is visible in FIGS. 3A and 3B). It will be understood that the present disclosure is not limited to a ratio of one cavity 118 per four orifices 116, and other configurations can be suitably implemented. A damper plug or modular damper plug 120 according to the present disclosure is received in each of the plurality of cavities 118 to form a multi-volume acoustic resonator 114 according to the present disclosure. The modular damper plug 120 can be fitted or secured in the respective cavity 118 in any suitable manner, including but not limited to securing the plug 120 in the cavity 118 using a welded joint, a bolted joint, a snap ring, or a press (interference) fit.

Although one acoustic resonator 114 (including a single modular damper plug 120 received in a single cavity 118) is visible in the cross-sections of FIGS. 3A and 3B, it will be understood that the acoustic liner 110 includes a plurality of acoustic resonators 114 (each including a modular damper plug 120 received in a single cavity 118), as will described in detail below with reference to FIGS. 5A and 5B. Of course, it will be understood that the present disclosure is not limited to acoustic liners including a plurality of multi-volume acoustic resonators 114, and that a single multi-volume acoustic resonator 114 can be implemented in various contexts to dampen instability across multiple frequencies.

Figure 3C:
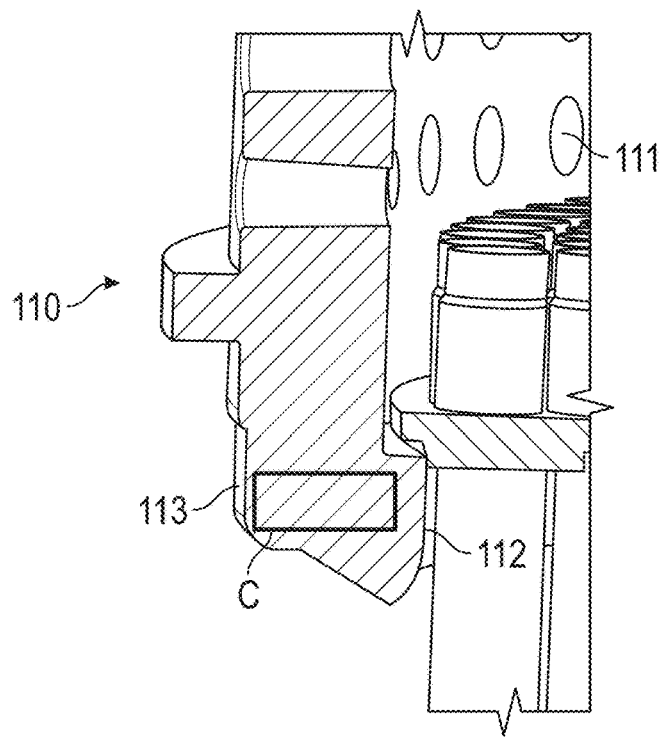
FIG. 3C illustrates a cross-section of an example acoustic liner before a cavity and a plurality of orifices are formed according to an embodiment of the present disclosure.

Advantageously, embodiments of the acoustic resonator 114 can be implemented in an acoustic liner 110 during or after manufacture of the acoustic liner 110 in accordance with the present disclosure. In one non-limiting example, a cavity 118 is machined into the outer side 113 of an existing acoustic liner 110, a plurality of orifices 116 are machined into the inner side 112 of the existing acoustic liner 110, and a modular damper plug 120 is inserted into the newly-machined cavity 118 to form an acoustic resonator 114 according to the present disclosure. Thus, the damper plug 120 of the present disclosure can be implemented as a modular block in an existing acoustic liner 110, without the need to gain access to or modify any other engine component. FIG. 3C illustrates a cross-section of the acoustic liner 110 before a cavity 118 is formed at section C and before a plurality of orifices 116 are formed inboard of section C. Thus, FIG. 3C illustrates the condition of the acoustic liner 110 in preparation to implement an acoustic resonator 114 according to the present disclosure. Any suitable method to form the cavity 118 through the outer side 113 and to form the plurality of orifices 116 through the inner side 112 can be implemented. Accordingly, in this example, the existing acoustic liner 110 can be machined to form one or more cavities 118 at a lower portion of the acoustic liner 110 (close to the at least one injector 100), and the modular damper plug 120 can be inserted into the cavity 118 as shown in FIG. 3B. In another non-limiting example, one or more cavities 118 are provided in an acoustic liner 110 when it is formed, for example when the liner is cast or molded.

Similarly, a plurality of orifices 116 can be provided in the acoustic liner 110 when it is formed, for example, when the liner is cast or molded.

Figure 4A:
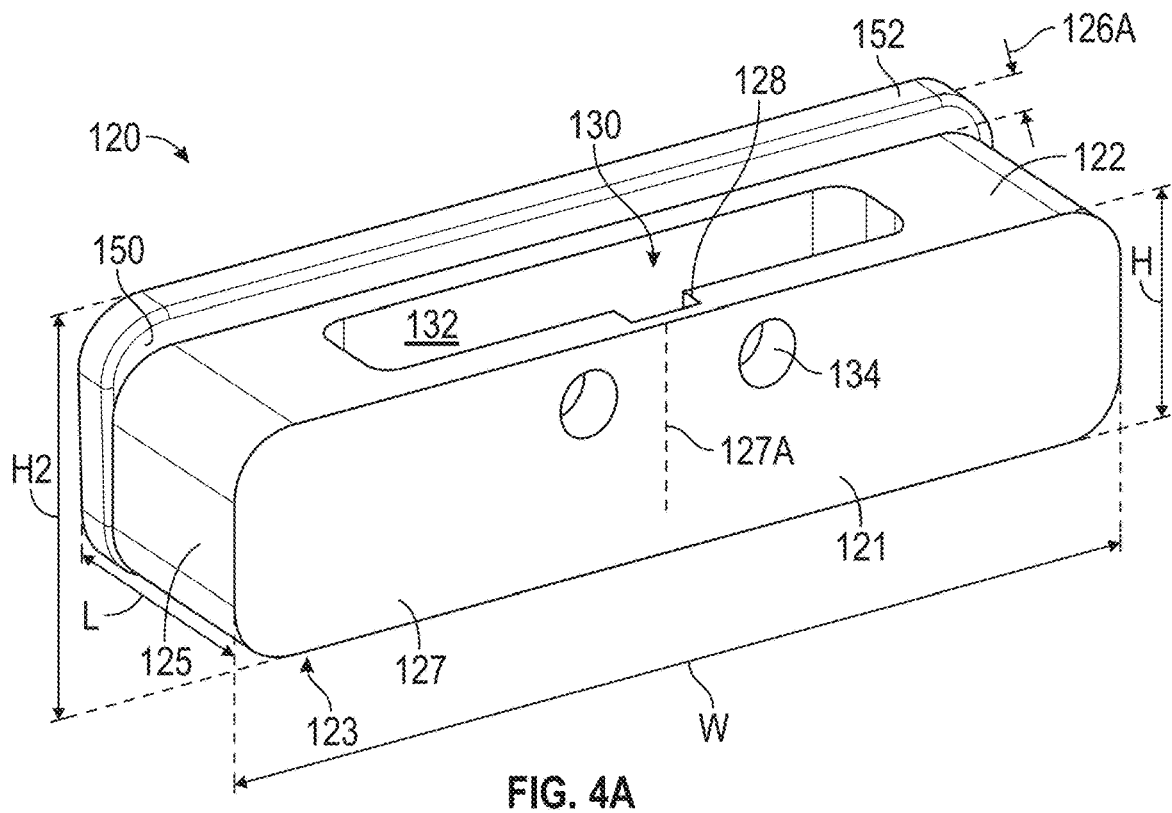
FIG. 4A illustrates an interior side and a top side view of a modular damper plug according to an embodiment of the present disclosure.
Figure 4B:
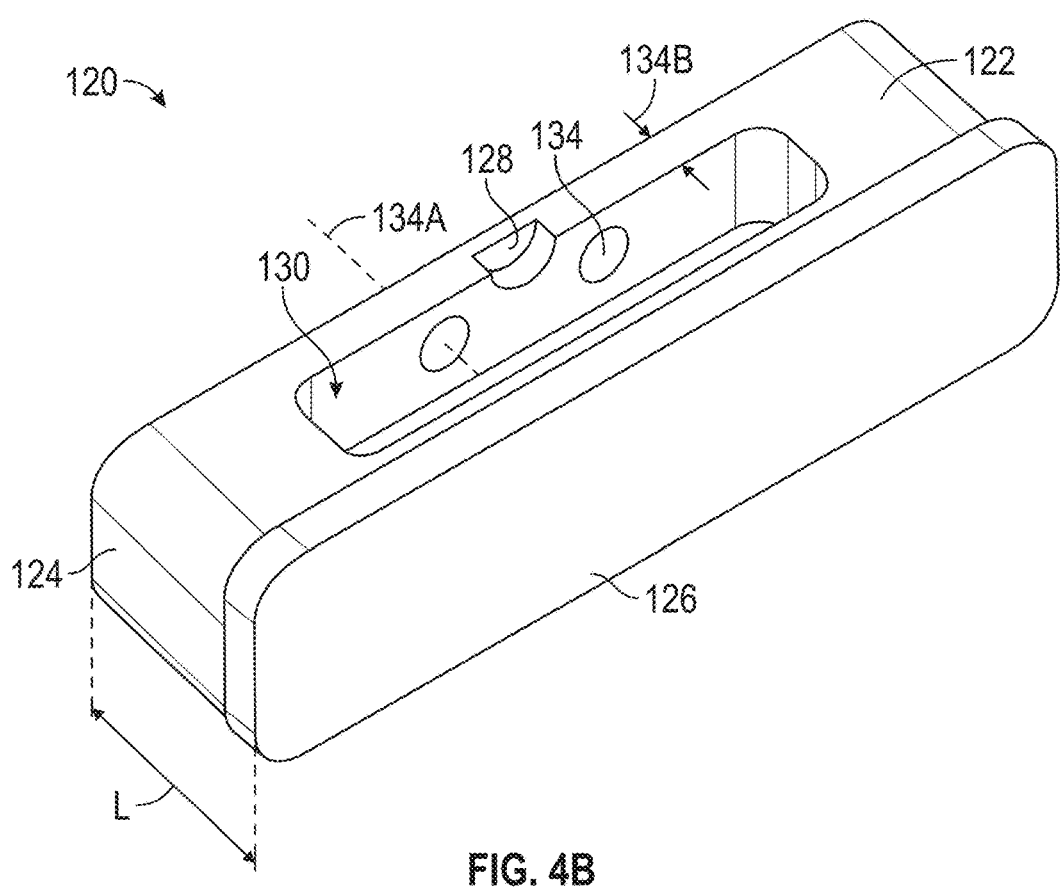
FIG. 4B illustrates an exterior side and a top side view of the modular damper plug of FIG. 4A.

Features of the example modular damper plug 120 will now be described in detail. FIGS. 4A and 4B illustrate perspective views of the modular damper plug 120 according to an embodiment of the present disclosure. FIG. 4A illustrates an interior side and a top side view of the modular damper plug 120. FIG. 4B illustrates an exterior side and a top side view of the modular damper plug 120. The modular damper plug 120 is configured to be received in an acoustic liner of a rocket engine to form an acoustic resonator. Embodiments of the modular damper plug 120 can be received in, for example, the acoustic liner 110 of the rocket engine 10, discussed with reference to FIGS. 1 and 2, to form an acoustic resonator 114, discussed with reference to FIGS. 3A and 3B.

The modular damper plug 120 includes a main body 121, which can be a solid or monolithic block of material. The main body 121 can be considered a unitary three-dimensional block or plug having a height H dimension, a width W dimension, and a length L dimension. The main body 121 includes a top surface 122 spaced from a bottom surface 123, a distance between the top surface 122 and the bottom surface 123 corresponding to the height H. The main body 121 also includes a left surface 124 spaced from a right surface 125, a distance between the left surface 124 and the right surface 125 corresponding to the width W. The main body 121 further includes an exterior surface 126 spaced from an interior surface 127, a distance between the exterior surface 126 and the interior surface 127 corresponding to the length L. It will be understood that the modular damper plug 120 is one non-limiting example, and that modular damper plugs according to the present disclosure can include other or different outer surfaces.

The modular damper plug 120 can be a unitary body formed from, for example, a single molded part or piece of material, but it will be understood that the modular damper plug 120 can be formed of multiple pieces of material that are connected or integrated together.

The modular damper plug 120 also includes a chamber 130 within the main body 121. The chamber 130 forms a first, upstream volume of the acoustic resonator 114 when the modular damper plug 120 is received in a cavity 118, such as but not limited to a cavity of an acoustic liner. The chamber 130 can be any suitable shape and size, and provided within the main body 121 in any suitable location. In the non-limiting embodiment illustrated in FIGS. 4A and 4B, the chamber 130 extends along a part of the height H, a part of the width W, and a part of the length L of the main body 121. In addition, in this non-limiting embodiment, the chamber 130 is generally centered between the left surface 124 and the right surface 125.

The chamber 130 communicates with the outer surface of the main body 121 through openings in at least one location. In some cases, the at least one location includes two exterior surfaces that are generally orthogonal to each other. For example, in the non-limiting embodiment illustrated in FIGS. 4A and 4B, the chamber communicates with the top surface 122 of the main body 121 through an opening 132. The chamber 130 also communicates with the interior surface 127 through one or more ducts 134. The top surface 122 and the interior surface 127 are generally orthogonal to each other. It will be understood that other locations for openings can be suitably implemented.

The modular damper plug 120 can be manufactured using a solid block of material that is machined to include the chamber 130. The modular damper plug 120 can be formed of any suitable material, in some examples the same material as the acoustic liner 110.

The one or more ducts 134 of the modular damper plug 120 can be arranged in any suitable location relative to the interior surface 127 and the chamber 130. The modular damper plug 120 can include any suitable number of ducts 134, including one, two, three, four, five, or more ducts 134. The ducts 134 can have any suitable cross-sectional shape, including but not limited to a circular, oval, square, or rectangular cross-sectional shape. In the non-limiting embodiment illustrated in FIGS. 4A and 4B, the modular damper plug 120 includes two ducts 134 equally spaced from a midline 127A of the interior surface 127, and generally closer to the top surface 122 than the bottom surface 123. In another example, the two ducts 134 are not asymmetrically arranged relative to the midline 127A. Other configurations are possible. By way of example and not limitation, the two ducts 134 can be arranged vertically relative to one another on the midline 127A, or another vertical line of the interior surface 127. Furthermore, in the non-limiting embodiment illustrated in FIGS. 4A and 4B, the modular damper plug 120 includes two ducts 134 having circular cross-sectional shapes. The ducts 134 each have an axis 134A extending in a horizontal direction generally perpendicular to the midline 127A of the interior surface 127, but it will be understood that other orientations can be suitably implemented. As will be described in more detail below with reference to FIG. 6, the ducts 134 are configured to allow gas and fluid to flow from the chamber 130 toward the combustor 200. In this example, the flow through the ducts 134 from the chamber 130 toward the combustor 200 is generally horizontal.

The main body 121 of the modular damper plug 120 is sized and shaped to be received in any one of the plurality of cavities 118 of the acoustic liner 110 to form a multi-volume acoustic resonator 114. The chamber 130 of the modular damper plug 120 forms a first, upstream volume V1 of the acoustic resonator 114. The portion of the cavity 118 inboard of the interior surface 127 forms a second, downstream volume V2 of the acoustic resonator 114. The one or more ducts 134 communicate gas and fluid between the first, upstream volume V1 and the second, downstream volume V2. The acoustic resonator 114 includes both the first, upstream volume V1 and the second, downstream volume V2 and is thus a multi-volume resonator.

Advantageously, the size and location of the first, upstream volume V1 can be adjusted, or optimized, to target a particular frequency or dampening characteristic by changing the dimensions and the position of the chamber 130 within the modular damper plug 120. Accordingly, embodiments of modular damper plugs 120 according to the present disclosure can advantageously form acoustic resonators 114 having a first, upstream volume optimized to achieve particular performance characteristics (for example, for a particular engine or use case).

Advantageously, the size of the second, downstream volume V2 can be adjusted, or optimized, to target a particular frequency or dampening characteristic by adjusting the length L of the main body 121 of the modular damper plug 120. The length dimension L of the main body 121 (in conjunction with a flange 150 preventing movement of the damper plug 120 inboard toward the orifices 116) establishes a position of the modular damper plug 120 at an insertion depth D within the cavity 118 (as shown in FIG. 3B). As will be described in greater detail below with reference to FIGS. 7A, 7B, and 7C, for a plurality of cavities 118 having identical or substantially identical dimensions provided in the acoustic liner 110, increasing the length L (and thereby the insertion depth D) of the modular damper plug 120 will decrease the size of the second, downstream volume V2 of the acoustic resonator 114. Similarly, decreasing the length L (and thereby the insertion depth D) of the modular damper plug 120 will increase the size of the second, downstream volume V2 of the acoustic resonator 114. Accordingly, embodiments of modular damper plugs 120 according to the present disclosure can advantageously form an acoustic resonator 114 having a second, downstream volume optimized to achieve particular performance characteristics (for example, for a particular engine or use case).

The upper part of the exterior surface 126 may include a flange 150 extending, along the height H dimension, a distance 126A from the top surface 122. Accordingly, a top surface 152 of the flange 150 can be spaced from the bottom surface 123 of the damper plug 120 by a second height H2 that is greater than the height H that separates the top surface 122 and the bottom surface 123. The flange 150 can be received in a groove 113A in the outer side 113 of the acoustic liner 110 when the modular damper plug 120 is received in the cavity 118, as shown in FIG. 3B. The flange 150 can assist with insertion, retention, and/or removal of the modular damper plug 120 in the cavity 118.

The modular damper plug 120 can have a generally rectangular shape, but other shapes can be suitably implemented. The interior surface 127 can have a generally rectangular shape with edges that may be filleted with a certain radius to have rounded or bullnose corners. The exterior surface 126 can have a generally rectangular shape corresponding to the shape of the interior surface 127, with edges that may be filleted with substantially the same radius to have rounded or bullnose corners. In embodiments that include a flange 150, the exterior surface 126 has a surface area greater than that of the interior surface 127.

As described above, the chamber 130 communicates with the top surface 122 of the modular damper plug 120 through an opening 132. In the non-limiting embodiment illustrated in FIGS. 4A and 4B, the opening 132 has a length and width coincident with the internal length and width of the chamber 132, but other configurations can be suitably implemented. In addition, the opening 132 has a generally rectangular shape with rounded corners but other shapes are possible.

The opening 132 of the modular damper plug 120 according to the present disclosure can optionally include an indented portion 128 opposite the interior surface 127. Referring to FIG. 4B, the indented portion 128 can have semi-circular cross-section when viewed from inside the chamber 130. The indented portion 128 is located on an interior surface of the chamber 130, between and above the ducts 134. As will be described in more detail with reference to FIG. 6, the indented portion 128 can be shaped, sized, and located to fluidically connect a purge channel 600 in the acoustic liner 110 to the chamber 130 (described in detail below with reference to FIG. 6), such that gas and fluid is transmitted to the chamber 130 from the purge channel 600.

The chamber 130 is configured as an upstream volume V1 for receiving gas and fluid (e.g., fuel or oxidizer) from the injector 100. In non-limiting embodiments, the chamber 130 receives gas and fluid at the opening 132 via the purge channel 600 (described in detail below with reference to FIG. 6) formed in the acoustic liner 110. The gas and fluid received in the chamber 130 through the purge channel then flows out through the ducts 134 and into the second, downstream volume V2 of the cavity 118. Accordingly, the modular damper plug 120 having the above-described configuration can transmit purged gas and fluid entering the chamber 130 through the one or more ducts 134 into the downstream volume V2 (see also volume 800 in FIG. 6) of the acoustic resonator 114. The gas and fluid travel from the purge channel to the upstream volume V1 and, through the ducts 134, to the downstream volume V2, which can have a significantly greater volume than that of the upstream volume V1. Since there are radical changes in the space or volume as the gas and fluid travel, the local flow rate (or velocity) thereof is also changed radically.

Accordingly, the flow rate of gas and fluid through the modular damper plug 120 (and thereby the acoustic resonator 114) can be tuned by changing the size and or location/position of dimensions of various features of the modular damper plug 120. The features and dimensions of the modular damper plug 120 that can be adjusted include, for example, the size and/or position of the chamber 130 (thereby changing the size and/or position of the upstream volume V1 of the acoustic resonator 114), and the size (for example, the length) of the main body of the modular damper plug 120 (thereby changing the size of the downstream volume V2 of the acoustic resonator 114, as will be described in greater detail with reference to FIGS. 7A, 7B and 7C).

The number and physical dimensions of the ducts 134 communicating gas and fluid between the upstream volume V1 and the downstream volume V2 are additional features of the modular damper plug 120 that can be adjusted to achieve a desired flow rate or other optimal performance characteristic. Embodiments of the modular damper plug 120 described herein include two ducts 134, but, as described above, the plug 120 can include one, three, four, or more ducts 134. In addition, the physical dimensions of the duct(s) 134 can be adjusted to achieve a particular flow rate or other performance characteristic. Physical dimensions that can be adjusted include a length 134B of the duct(s) 134, the cross-sectional shape of the duct(s), and the flow area of the duct(s) 134. In the non-limiting embodiment of FIGS. 4A and 4B, the diameter of two ducts 134 having a circular cross-section can be adjusted to achieve a selected flow rate.

Accordingly, frequency-targeting properties of damper plugs according to the present disclosure can be advantageously adjusted, or tuned, by changing a volume and/or location of a chamber 130 within the damper plug 120 (thereby changing the acoustic resonator's first, upstream volume V1); and/or changing the length L (or insertion depth D) of the damper plug 120 within a respective cavity 118 of the liner 110 (thereby changing the acoustic resonator's second, downstream volume V2); and/or changing the number and physical dimensions of ducts communicating gas and fluid from the upstream volume V1 to the downstream volume V2. It is an advantage of damper plugs of the present disclosure that each of these three features can be independently adjusted or tuned. As one example, the volume and/or location of the chamber 130 within the damper plug 120 can be changed without adjusting the length L of the damper plug 120 or the characteristics of the duct(s) 134. As another example, the length L of the damper plug 120 can be adjusted without adjusting the volume or location of the chamber 130 or the characteristics of the duct(s) 134. As still another example, the characteristics of the duct(s) 134 can be adjusted without adjusting the volume and/or location of chamber 130 or the length L of the damper plug 120.

Exemplary embodiments of the acoustic liner 110 will be described in connection with the example modular damper plug 120 described above. However, the embodiments described herein are merely examples and not intended to be interpreted in any limited or restrictive manner.

Example Acoustic Liner

As described above, modular damper plugs of the present disclosure form multi-volume acoustic resonators having a first, upstream volume, and a second, downstream volume. As a result, an acoustic resonator including a single damper plug according to the present disclosure can target more than one frequency. Moreover, each frequency can be independently targeted for dampening, because the upstream volume, the downstream volume, and ducts that communicate between the volumes can be independently adjusted.

An acoustic liner of a rocket engine can advantageously include a plurality of different modular damper plugs according to the present disclosure. Each damper plug received in an acoustic liner can form an acoustic resonator optimized to target particular frequencies, or chamber modes. The performance characteristics of each damper plug can be independently adjusted, as described above, while at the same time maintaining the modularity of the exterior shape and dimension of each plug. For example, the upstream volume V1 of an acoustic resonator 114 according to the present disclosure can be independently adjusted by changing the volume of the chamber 130 within the main body 121 of a damper plug 120 of the acoustic resonator 114, while maintaining the exterior shape and dimensions of the main body 121 of the damper plug 120 common across all damper plugs 120 received in the acoustic liner 110. The downstream volume V2 of the acoustic resonator 114 can be independently adjusted by changing the length L of the main body 121 of the damper plug 120, while maintaining all other exterior shape and dimensions of the main body 121 common across all damper plugs 120. Implementing a plurality of modularly-shaped damper plugs 120 in an acoustic liner 110 in this manner, with each damper plug 120 independently targeting multiple frequencies, can enable greater flexibility and range to reduce combustion instability in liquid rocket engines.

Figure 5A:
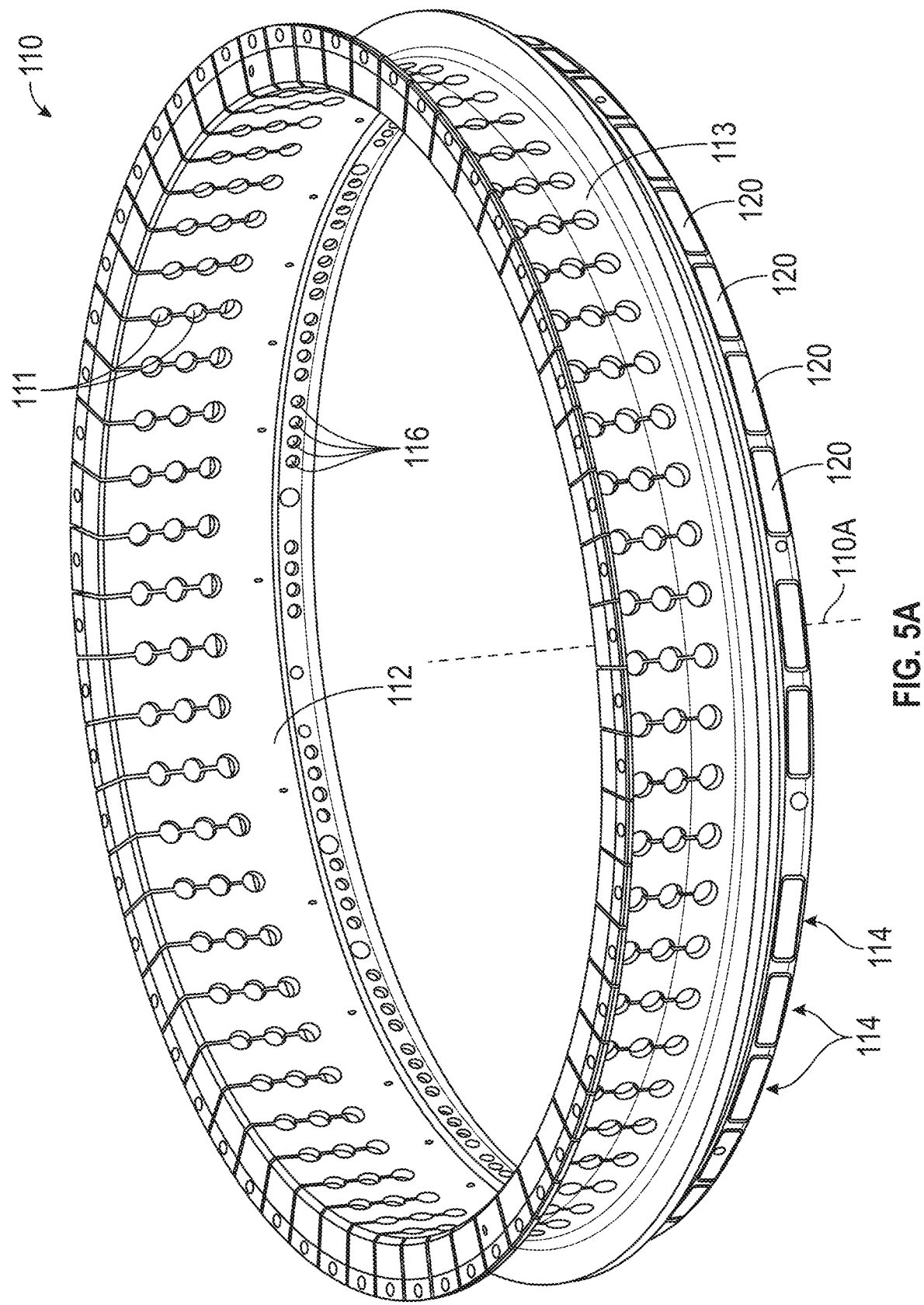
FIG. 5A illustrates an example acoustic liner (or cavity ring) having a plurality of modular damper plugs installed in a plurality of cavities to form multi-volume acoustic resonators according to an embodiment of the present disclosure.
Figure 5B:
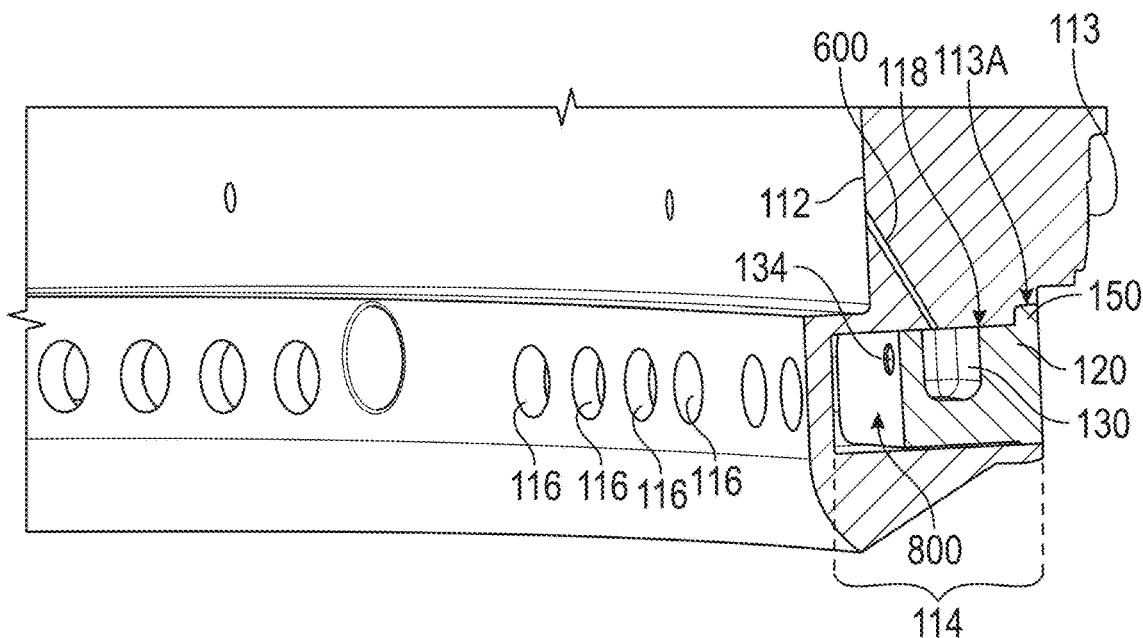
FIG. 5B illustrates a close-up cross-sectional view of the acoustic liner of FIG. 5A with a modular damper plug received in a cavity to form a multi-volume acoustic resonator cavity according to an embodiment of the present disclosure.

FIG. 5A illustrates an example acoustic liner 110 having a plurality of modular damper plugs 120 installed in a plurality of cavities 118 to form respective acoustic resonators 114. FIG. 5B illustrates a close-up cross-sectional view of the acoustic liner 110 with a modular damper plug 120 received in a cavity 118 to form a multi-volume acoustic resonator 114 according to an embodiment of the present disclosure. As described above, the acoustic liner 110 may be fitted inside the rocket engine 10, more specifically, inside the combustor 200 of the rocket engine 10 surrounding the at least one injector 100 (refer to FIGS. 2 and 3A). As shown in FIG. 5A, the acoustic liner 110 may include the plurality of holes 111 arranged to be spaced apart from each other vertically and horizontally. The acoustic liner 110 may further include a plurality of cavities 118 formed or machined in an outer side 113 of the acoustic liner 110 and extending inwardly toward an interior side 112 of the acoustic liner 110. Each cavity 118 communicates with the interior surface 112 via a plurality of orifices 116 having a significantly reduced volume/size relative to the cavity 118. In some embodiments, one cavity 118 may communicate with one orifice 116 or more than one orifice 116. In some specific examples, there may be four orifices 116 communicating with one cavity 118.

According to one non-limiting embodiment of the present disclosure, each of the plurality of cavities 118 has an identical or substantially identical size and shape to receive a modular damper plug 120. In the non-limiting embodiment of FIGS. 5A and 5B, the cavities 118 have the general shape of a rectangular prism with an opening at the exterior side 113 of the acoustic liner 110 being formed or machined to include the groove 113A that corresponds to the flange 150 of the modular damper plug 120. In this non-limiting embodiment, the acoustic liner 110 includes thirty-two (32) cavities; however, the number of cavities 118 is not limited thereto. The number of cavities 118 may be less than or more than 32, for example the acoustic liner may include 24, 30, 36, 60 or any other suitable number of cavities 118.

FIG. 5A shows each of a plurality of modular damper plugs 120 is fitted into one the plurality of cavities 118, respectively. Each of the plurality of modular damper plugs 120 may be the same or different from each other. For instance, each modular damper plug 120 may have the same exterior shape and volume, the same chamber 130, and the same number and configuration of duct(s) 134, or there may be two different modular damper plugs 120 alternately arranged such that a first type or model of modular damper plug 120 may have a length L greater than a second type or model of modular damper plug 120. Examples of different types or models of modular damper plugs will be described further in detail in connection with FIGS. 7A, 7B, and 7C. At the same time, each of the plurality of damper plugs 120 are modular, such that any one of the plurality of damper plugs 120 is interchangeable with any other of the plurality of damper plugs 120 in terms of which cavity can receive the damper plug. In other words, any one of the plurality of damper plugs 120 can be received in any one of the cavities 118 of the acoustic liner 110, even though features of the chamber 130, the exterior length L, and/or features of the duct(s) 134 may vary across models of the damper plug. Accordingly, any damper plug 120 of a plurality of damper plugs 120 can be received in any one of a plurality of identical or substantially identical cavities 118 formed within the acoustic liner 110, independent of the frequency-targeting properties of the individual damper plug 120.

Figure 6:
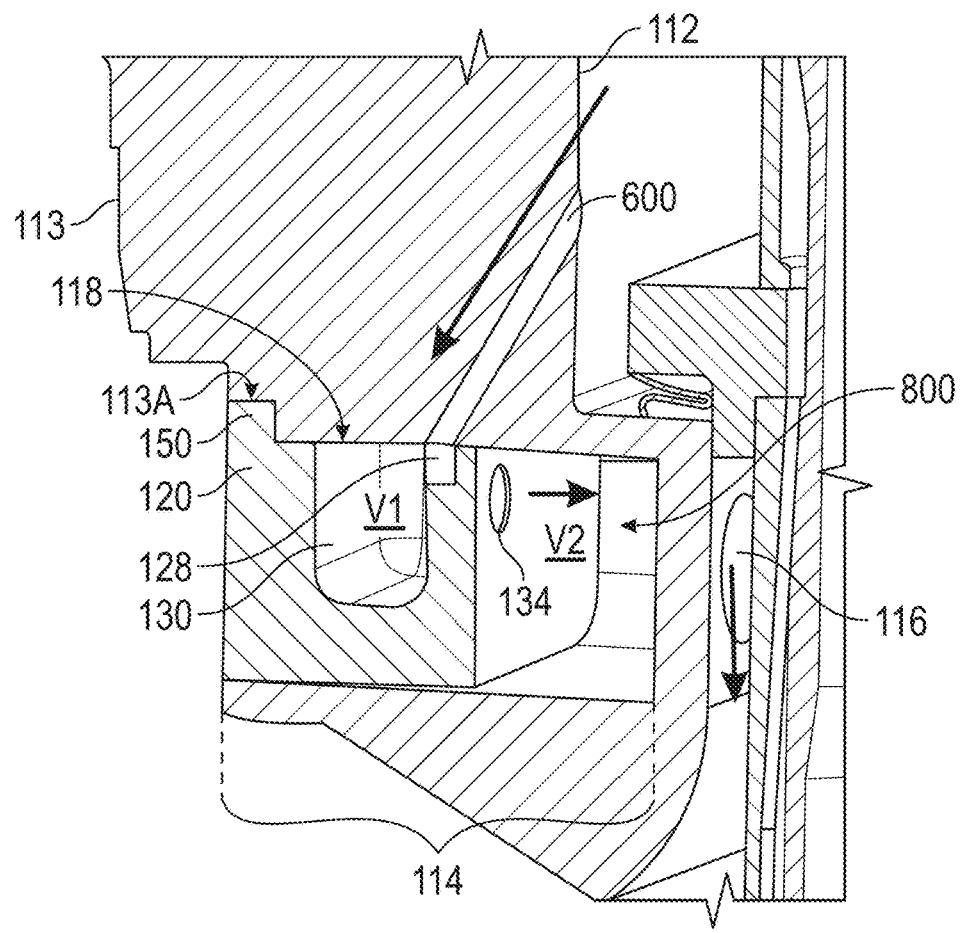
FIG. 6 illustrates an example purge channel and flow of gas and liquid in a cross-section of a multi-volume acoustic resonator according to an embodiment of the present disclosure.

As briefly described above, the acoustic liner 110 according to the present disclosure may include a plurality of purge channels 600. FIG. 6 illustrates an example purge channel 600 in a cross-section of an acoustic resonator 114 in the acoustic liner 110 according to an embodiment of the present disclosure. Gas and fluid flows through the purge channel 600, into the chamber 130 via the indented portion 128, exits the modular damper plug 120 through the ducts 134, enters the portion 800 of the cavity 118 forming the downstream volume V2, and exits the cavity 118 out through the orifices 116. Each purge channel 600 of a plurality of purge channels 600 in the acoustic liner 110 can communicate with a manifold of the rocket engine 10 and a corresponding cavity 118 in the acoustic liner.

As illustrated in the embodiment of FIG. 6, in models of the modular damper plug 120 that include the indented portion 128, the purge channel 600 fluidically communicates with the chamber 130 via the indented portion 128 of the modular damper plug 120. As will be described below with reference to FIGS. 7A, 7B, and 7C, some models of the modular damper plug 120 do not include an indented portion 128. In such models, the corresponding purge channel 600 communicates with the chamber 130 at a top of the opening 132.

As noted above, the acoustic liner 110 may include a plurality of purge channels 600, each of which communicates with a corresponding cavity 118. In other examples, the acoustic liner 110 may include more than one purge channel 600 communicating with one cavity 118.

Example Models of Modular Damper Plugs

Acoustic liners according to the present disclosure can include more than one type or model of modular damper plug. For example, an acoustic liner can include a plurality of damper plugs of a first model, a plurality of damper plugs of a second model, and a plurality of damper plugs of a third model, where the upstream volume of the damper plug varies between each model and the length of the damper plug varies between each model (such that the downstream volume of the respective acoustic resonator also varies). The different models of damper plugs can thus form a plurality of multi-volume acoustic resonators that, collectively, cover a broad range of frequencies.

Embodiments of different models of modular damper plugs according to the present disclosure will be described with reference to FIGS. 7A-7G. FIGS. 7A, 7B, and 7C illustrate three different models of modular damper plugs 120, Model 001, Model 002, and Model 003, inserted in three corresponding cavities 118 in the acoustic liner 110 to form three multi-volume acoustic resonators 114 achieving different target frequencies according to an embodiment of the present disclosure. The shape and dimensions of exterior surfaces of the modular damper plugs 120 can be substantially the same for Model 001, Model 002, and Model 003 (with the exception of the exterior length L, which varies between models in this non-limiting example). Further, as described above, the cavities 118 of FIGS. 7A, 7B, and 7C have identical or substantially identical dimensions. Accordingly, in this non-limiting example, any one of a plurality of damper plugs 120 of Model 001, any one of the plurality of damper plugs 120 of Model 002, and any one of a plurality of damper plugs 120 of Model 003 can be received in any one of the plurality of cavities 118 of the acoustic liner 110.

For instance, FIG. 7A shows an exemplary damper plug 120-001 (hereinafter "first modular damper plug") of Model 001 having a chamber 130-001 that forms a first upstream volume V1-001 of a first acoustic resonator 114-001. The first modular damper plug 120-001 has an exterior length L-001 and is inserted into a cavity 118-001 at an insertion depth D-001. The acoustic resonator 114-001 also includes a second downstream volume V2-001 having a dimension 800-001. FIG. 7B shows an exemplary damper plug 120-002 (hereinafter "second modular damper plug") of Model 002 having a chamber 130-002 that forms a first upstream volume V1-002 of a second acoustic resonator 114-002. As can be seen, the second modular damper plug 120-002 has an exterior length L-002 and is inserted into a cavity 118-002 at an insertion depth D-002. The exterior length L-002 is greater than the exterior length L-001 of the first modular damper plug 120-001. As a result, when the second modular damper plug 120-002 is inserted in a cavity 118-002 to form the second acoustic resonator 114-002, a second downstream volume V2-002 (that is, the space formed inside the cavity 118-002 between the damper plug 120-002 and the orifices 116 when the damper plug 120-002 is inserted), is less than the second downstream volume V2-001 of the first acoustic resonator 114-001.

The first modular damper plug 120-001 includes an indented portion 128 that communicates with a purge channel 600 (not shown in FIG. 7A). In this non-limiting example, the length L-001 of the first modular damper plug 120-001 (and consequently the insertion depth D-001) may be such that the opening 134 of the first modular damper plug 120-001 is not in direct fluid communication with the purge channel 600. In such examples, the modular damper plug 120 can include the indented portion 128 to fluidically connect the purge channel 600 with the opening 134. Advantageously, implementing the indented portion 128 in some but not all of the modular damper plugs 120 as needed allows each of the plurality of purge channels 600 to have a common configuration and location within the acoustic liner 110, and still communicate with any model of modular damper plug 120 that is received in a particular cavity 118.

Implementations of the present disclosure are not limited to two different damper plug models. Any suitable number of different damper plug models can be suitable implemented in accordance with the present disclosure. In this non-limiting example, the acoustic liner 110 includes a third damper plug 120-003 (hereinafter "third modular damper plug") of Model 003 shown in FIG. 7C. The third modular damper plug 120-003 has a chamber 130-003 that forms a first upstream volume V1-003 of a third acoustic resonator 114-003. The third modular damper plug 120-003 has an exterior length L-003 and is inserted into a cavity 118-003 at an insertion depth D-003. The exterior length L-003 is greater than the exterior length L-001 of the first modular damper plug 120-001 and the length L-001 of the second modular damper plug 120-002. As a result, the second downstream volume V2-003 of the third modular damper plug 120-003 has the smallest volume of the three modular damper plugs 120-001, 120-002, and 120-003.

In addition, the chamber of each of the modular damper plugs 120-001, 120-002, 120-003 has a different size (e.g., a length L in the x-direction, a height H in the y-direction, and/or a width in the z-direction), so as to form upstream volumes V1 of differing dimensions for each acoustic resonator 114-001, 114-002, and 114-003. In this non-limiting embodiment, the chamber 130-001 of the first modular damper plug 120-001 has a greater volume than the chamber 130-002 of the second modular damper plug 120-002. The chamber 130-002 of the second modular damper plug 120-002 has a greater volume than the chamber 130-003 of the third modular damper plug 120-003. Thus, all three chambers achieve different target frequencies. The size and location of the chambers 130-001, 130-002, and 130-003 can be independently optimized to be different, as in this example, or the same, to achieve different target frequencies in the respective multi-volume acoustic resonators.

Each of the multi-volume acoustic resonators 114-001, 114-002, and 114-003 each include a first upstream volume V1 that differs from the other two models, and each include a second downstream volume V2 that differs from the other two models. Accordingly, each model of modular damper plug 120 forms a multi-volume acoustic resonator that can target different frequencies. For instance, the first modular damper plug 120-001 may be configured to target a low and a middle frequency range, the second modular damper plug 120-002 is configured to target the middle frequency range and a high frequency range, and the third modular damper plug 120-003 is configured to target the high frequency range. In one example, the acoustic resonator 114-001 is configured to target a first range of frequencies, the acoustic resonator 114-002 is configured to target a second range of frequencies that at least partially overlaps the first range of frequencies, and the acoustic resonator 114-003 is configured to target a third range of frequencies that at least partially overlaps the second range of frequencies. Such frequency ranges can be tuned as desired to obtain the optimal frequency ranges by modifying the above-described features of the modular damper plug.

FIGS. 7D and 7E illustrate features of the example modular damper plug 120-001 of FIG. 7A, and FIG. 7F is a table illustrating features of the example modular damper plugs 120-001, 120-002, and 120-003 of FIGS. 7A, 7B, and 7C, respectively. For example, L-001 in FIG. 7A and FIG. 7F indicates an exterior length in the x-direction of about 0.48-0.52 inches for the first modular damper plug 120-001. As shown in FIG. 7F, L-002 for the second modular damper plug 120-002 is about 0.58-0.62 inches, and L-003 for the third modular damper plug 120-003 is about 0.68-0.72 inches, consistent with the above description that the third modular damper plug 120-003 has an exterior length L-003 greater than the exterior length L-001 of the first modular damper plug 120-001 and the exterior length L-002 of the second modular damper plug 120-002. FIG. 7F also illustrates that some, but not all, models of modular damper plugs 120 can include an indented portion 128. In this non-limiting example, the opening 134 of the first modular damper plug 120-001 is not in direct fluid communication with the purge channel 600, and an indented portion 128 is included to fluidically connect the purge channel 600 with the opening 134. In contrast, the openings 134 of the second modular damper plug 120-002 and the third modular damper plug 120-003 are in direct fluid communication with a respective purge channel 600, and an indented portion 128 is not included in these two models.

FIG. 7G is a table illustrating additional dimensions and features of the example modular damper plugs 120-001, 120-002, and 120-003 of FIGS. 7A, 7B, and 7C. For example, the upstream volume (V1-001) of the chamber 130-001 of the first modular damper plug 120-001 is about 0.090 cubic inches. Similarly, the downstream volume V2-001 of the first modular damper plug 120-001 is about 0.374 cubic inches. As shown in FIGS. 7A-7G, the three different models of modular damper plugs have dimensions that vary, resulting in different upstream volumes and different downstream volumes across models, yet each model is received in a cavity 118 of identical or substantially identical size and shape. As demonstrated in FIGS. 7A-7G, dimensions of a modular damper plug according to the present disclosure can be varied to vary the frequency-targeting characteristics of the damper plug, more specifically, the upstream volume V1, number and physical dimensions of ducts (identified as "intermediate orifice" in FIG. 7G), and the downstream volume V2. In addition, the upstream orifice identified in FIG. 7G corresponds to the fluidic connection between the indented portion 128 and the purge channel 600, and the downstream orifice identified in FIG. 7G corresponds to the plurality of orifices 116. In this non-limiting embodiment, there are four orifices 116 communicating with each of the downstream volumes V2-001, V2-002, and V2-003 of the acoustic resonators 114-001, 114-002, and 114-003, respectively.

In summary, the first acoustic resonator 114-001 may have an upstream volume V1-001 of about 0.090 cubic inches and a downstream volume V2-001 of about 0.37 cubic inches, the second acoustic resonator 114-002 may have an upstream volume V1-002 of about 0.061 cubic inches and a downstream volume V2-002 of about 0.29 cubic inches, and the third acoustic resonator 114-003 may have an upstream volume V1-003 of about 0.032 cubic inches and a downstream volume V2-003 of about 0.21 cubic inches. Accordingly, it is possible to vary the frequencies targeted by each acoustic resonator by changing the volumes through which the gas and fluid travel, so as to dampen resonance according to design requirements of a particular engine or use case.

As briefly described with reference to FIGS. 4A and 4B, the ducts 134 of the modular damper plug 120 according to the present disclosure may be spaced apart from each other. Referring to FIG. 7A, the axes 134A of one or more ducts 134 of the first modular damper plug 120-001 may be spaced from the axes 116A of the plurality of orifices 116 by a distance 116B measured along the longitudinal axis 110A of the acoustic liner 110. Other configurations can be suitably implemented.

Advantageously, different models of modular damper plugs of the present disclosure can be implemented in an acoustic liner with a distribution and a ratio that achieves specific performance parameters. In one non-limiting embodiment in which an acoustic liner 110 includes 30 cavities 118, first modular damper plugs 120-001 may be received in ten of the cavities 118, second modular damper plugs 120-002 may be received in ten of the cavities 118, and third modular damper plugs 120-003 may be received in the remaining ten of the cavities 118. That is, there may be three different shapes of damper plug fitted into the cavities with even distribution to achieve three different target frequency modes. However, this is merely an example so that the number of cavities, the number of models of the modular damper plugs, and the distribution and ratio of the modular damper plugs may be modified for different target frequency ranges and to achieve selected performance parameters. For example, in one non-limiting embodiment, the acoustic liner 110 includes 32 cavities 118, and the ratio of first modular damper plug 120-001 to second modular damper plug 120-002 to third modular damper plug 120-003 is 1:2:1 (such that first modular damper plugs 120-001 are received in 8 cavities, second modular damper plugs 120-002 are received in 16 cavities, and third modular damper plugs 120-003 are received in 8 cavities). It will be understood, however, that the ratio of the models of modular damper plugs received in an acoustic liner may be varied, for example, the ratio may be 1:1:1 or 1:3:1 or 1:2:2:1 (in a case where four models of modular damper plugs are implemented).

Referring back to FIG. 6, any of the above-described modular damper plugs 120 allow the gas and/or liquid and gas mixture to flow firstly diagonally via the purge line 600 to the upstream volume V1 of the modular damper plug 120 inside the cavity 118, flow horizontally out from the upstream volume V1 to the downstream volume V2 through the ducts 134, and finally flow out from the downstream volume V2 to outside (for example, toward the combustor 200 of the engine 10) through the one or more orifices 116 in a downward direction as the arrows indicate. Such changes in flow direction further dampen the resonance, in addition to the various changes of the volumes and holes/orifices through which the gas and liquid flow. It will be understood that these flow paths are exemplary and other configurations can be suitably implemented in accordance with the present disclosure.

Figure 8A:
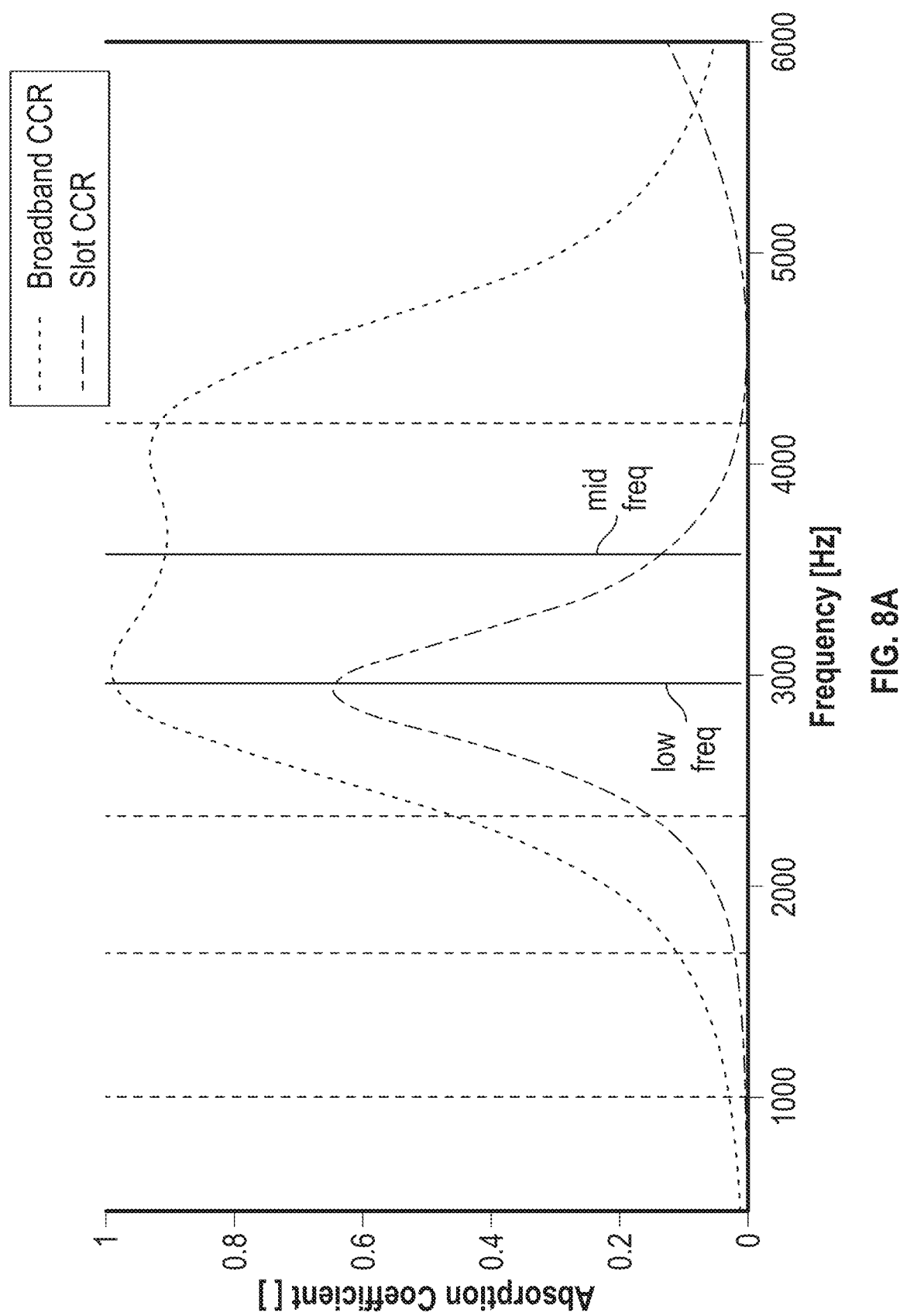
FIG. 8A is a graph illustrating properties of (1) a broadband closed cavity ring (CCR) implementing multi-volume acoustic resonators according to the present disclosure, and (2) a CCR including single-volume single-slot acoustic resonators implemented in prior technologies.

Properties and performance characteristics of non-limiting embodiments of the present disclosure will now be described with reference to FIGS. 8A, 8B, and 9. FIG. 8A is a graph illustrating properties of two different acoustic resonator designs: (1) a broadband closed cavity ring (CCR) implementing multi-volume acoustic resonators according to the present disclosure, and (2) a CCR including single-volume single-slot acoustic resonators implemented in prior technologies.

Turning to experimental results illustrated in FIG. 8A, the CCR including single-volume single-slot acoustic resonators is representative of commonly-implemented acoustic resonator designs having a single volume and a single slot opening. Such a slot acoustic resonator typically includes a large open area and can achieve a high absorption coefficient at its target frequency. Absorption coefficient ranges between zero and one and is a measure of how much sound energy at a particular frequency is absorbed and not reflected. The absorption coefficient is not constant and depends strongly on frequency. It is thus helpful to analyze the correlation between the absorption coefficient and the wavelength or frequency. As described above, acoustic resonators can be designed to target a desired frequency or range of frequencies with a high absorption coefficient. Thus, experimental tests were conducted to evaluate the performance of different designs in achieving a desired frequency or frequency range at a high absorption coefficient. In the test results illustrated in FIG. 8A, the designs were evaluated for their ability to target a wide frequency range. As illustrated in FIG. 8A, the resonators in the slot CCR design produced one single frequency mode at a lower absorption coefficient with a narrow frequency range at the peak. Thus, the absorption peak is narrow for the single-volume single-slot resonator, and its large open area results in ineffective purging and more variable cavity temperature, which affects the frequency-targeting accuracy.

In contrast, the Broadband CCR design implemented a multi-volume acoustic resonator including a single Model 120-001 modular damper plug, according to embodiments of the present disclosure. This multi-volume acoustic resonator achieved a wider frequency range of effectiveness (e.g., between low, middle, and high frequency ranges) than the resonator in the slot CCR design. This multi-volume cavity is also effectively purged, which increases robustness to temperature fluctuations.

FIG. 8B is a graph illustrating properties of a broadband closed cavity ring (CCR) implementing three different modular damper plugs according to the present disclosure. In this test, a plurality of modular damper plugs of each model type described above (Model 120-001, 120-002, and 120-003) were implemented in an acoustic liner. In this experiment, eight (8) of the first modular damper plug (Model 120-001), sixteen (16) of the second modular damper plug (Model 120-002), and eight (8) of the third modular damper plug (Model 120-003) were arranged in a ratio of 1:2:1 in an acoustic liner having 32 cavities.

As demonstrated in FIG. 8B, implementing a plurality of different damper plug models according to embodiments of the present disclosure achieved a wider target frequency range. For example, the first modular damper plug (Model 120-001) described above produced high absorption coefficients at low and high frequency ranges. The second modular damper plug (Model 120-002) described above produced high absorption coefficients at mid and high frequency ranges. The third modular damper plug (Model 120-003) described above produced high absorption coefficients at higher frequency ranges. Thus, the plurality of different damper plug models advantageously allow a wide range of modes to be targeted. The experimental results were obtained using a "Damper Sizing Tool" modeling software developed by Blue Origin®, which models the performance of multi-volume acoustic resonators by varying the size/shape/number and other features of modular damper plugs received in the liner. The test results confirmed that the modular damper plugs according to the present disclosure can provide a wider range of frequencies (e.g., 3-6 kHz in this example), allowing more efficient/desirable purging of the gas or gaseous mixture. These results confirm that the cavity temperature, which directly correlates to the combustion stability, can be controlled by tuning or adjusting the features of modular damper plugs according to the present disclosure, without modifying any existing engine or acoustic liner design.

Figure 9:
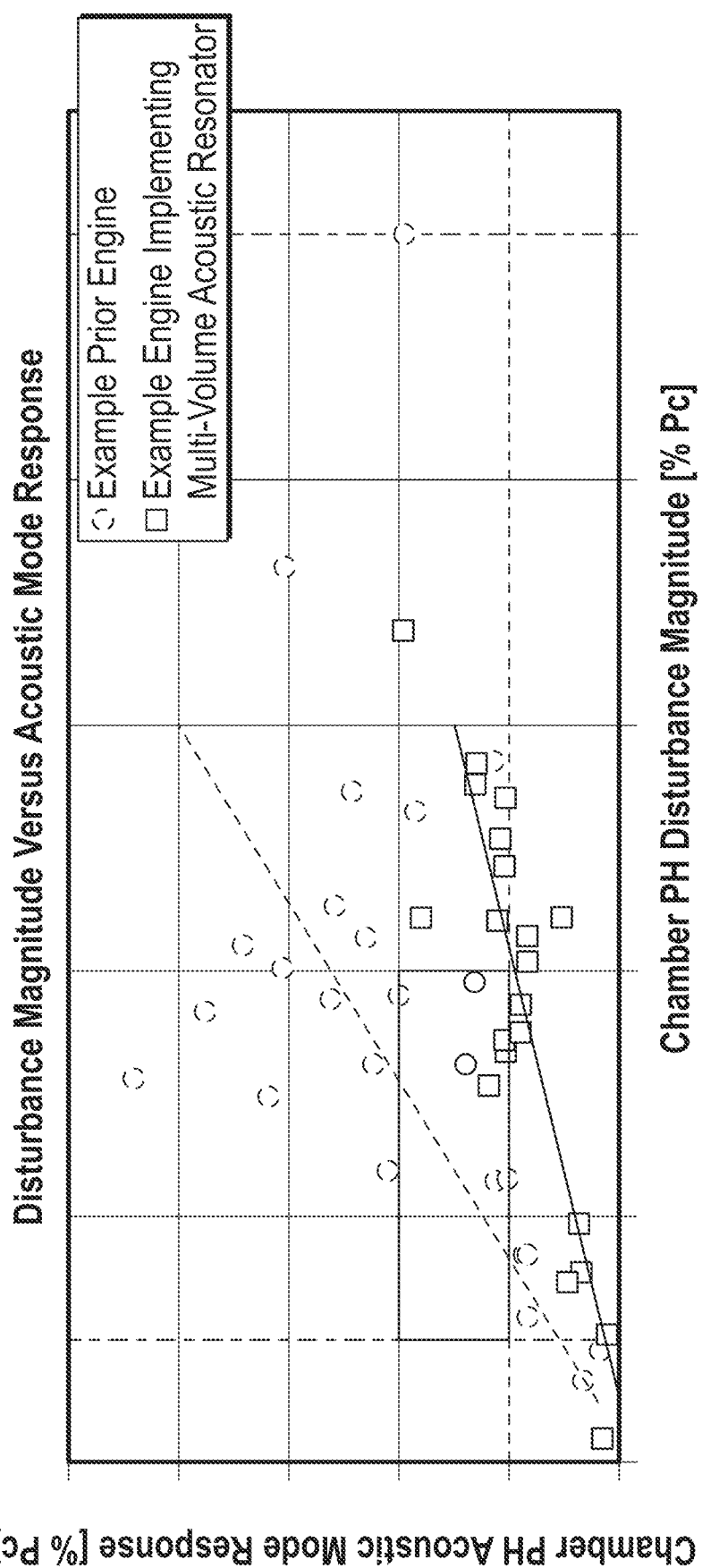
FIG. 9 is a graph illustrating disturbance magnitude versus modal response of an engine implementing the broadband CCR of FIG. 8B and a prior engine that does not implement a broadband CCR according to the present disclosure.

FIG. 9 is a graph illustrating disturbance magnitude versus modal response of an engine implementing the broadband CCR of FIG. 8B and a prior engine that does not implement a broadband CCR according to the present disclosure. More specifically, the square symbols represent stability points of an engine implementing multi-volume acoustic resonators having the modular damper plugs of the present disclosure (3 different damper plug models fitted in 32 cavities in a ratio of 1:2:1 targeting 3-6 kHz as described above), and the circular symbols represent stability points of a prior engine that does not implement the multi-volume acoustic resonators. The y-axis represents maximum acoustic mode response (%) (a function of the damping of the resonator) using a Stability Rating Device (SRD), also known as a pulse-gun, which provides an abrupt pressure impulse to a combustor. The x-axis represents a chamber PH disturbance magnitude (%) and plots the initial "impulse" magnitude (a function of SRD performance). The test results in FIG. 9 demonstrate that the multi-volume acoustic resonators implementing modular damper plugs according to the present disclosure have a reduced modal response to the same initial disturbance as compared to the generally-implemented resonator, confirming the improved stability characteristics of embodiments of the present disclosure.

It will be understood that embodiments of the multi-volume acoustic resonator according to the present disclosure can include any suitable number of necks, for example N+1 sets of necks where N is the number of interconnected volumes of the resonator. The non-limiting example multi-volume acoustic resonator 114 described above includes an upstream volume and a downstream volume (N=2), and three sets of necks (ducts 134, orifices 116, and purge channel 600). Further, in this example, the multi-volume acoustic resonator includes a first set of necks (ducts 134) that are integrally formed in a damper plug that is inserted into a cavity of the acoustic liner (that is, they are necks that are not formed or provided in the acoustic liner) and a second set of necks (orifices 116) that are formed in (for example, machined into) the acoustic liner.

As can be seen, three frequency mode ranges were achieved by implementing three different modular damper plug models in cavities which have the same size and shape. According to embodiments of the present disclosure, it is possible to reduce operation changes and manufacturing variations, with minimal structural changes to an existing acoustic liner. The above-described configurations can increase the viscous and inductive damping of the cavity relative to the conventional design. Thus, it is possible to implement embodiments of the present disclosure in any existing rocket engine to reduce combustion instability. In addition, the above-described configurations can advantageously target a wide range of frequencies with the same, or small variations of the same, resonator design.

Reference to "one embodiment," "an embodiment," or "in some embodiments" herein means that a particular feature, structure, or characteristic described in connection with the embodiment is included in at least one embodiment of the present disclosure. The appearances of the phrases "one embodiment," "an embodiment," or "in some embodiments" in various places are not necessarily all referring to the same embodiment, nor are separate or alternative embodiments necessarily mutually exclusive of other embodiments. Moreover, various features are described which may be exhibited by some embodiments and not by others.

While the above detailed description has shown, described, and pointed out novel features of the present disclosure as applied to various embodiments, it will be understood that various omissions, substitutions, and changes in the form and details of the device or process illustrated may be made by those skilled in the art without departing from the spirit of the present disclosure. As will be recognized, the present disclosure may be embodied within a form that does not provide all of the features and benefits set forth herein, as some features may be used or practiced separately from others. All changes which come within the meaning and range of equivalency of the claims are to be embraced within their scope.

The term "comprising" as used herein is synonymous with "including," "containing," or "characterized by," and is inclusive or open-ended and does not exclude additional, unrecited elements or method steps. With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Unless indicated to the contrary, the numerical parameters set forth in the specification and attached claims are approximations that may vary depending upon the desired properties sought to be obtained by the present disclosure. At the very least, and not as an attempt to limit the application of the doctrine of equivalents to the scope of the claims, each numerical parameter should be construed in light of the number of significant digits and ordinary rounding approaches. For example, terms such as about, approximately, substantially, and the like may represent a percentage relative deviation, in various embodiments, of ±1%, ±5%, ±10%, or ±20%.

The above description discloses several methods and materials of the present disclosure. The present disclosure is susceptible to modifications in the methods and materials, as well as alterations in the fabrication methods and equipment. Such modifications will become apparent to those skilled in the art from a consideration of this disclosure. Consequently, it is not intended that the present disclosure be limited to the specific embodiments disclosed herein, but that it covers all modifications and alternatives coming within the true scope and spirit of the present disclosure.

What is claimed is:

1. A system comprising:
    an acoustic liner comprising a plurality of cavities; and
    a first modular damper plug comprising
        a main body comprising a top surface spaced from a bottom surface by a first height, a left surface spaced from a right surface by a width, and an exterior surface spaced from an interior surface by a length, and
        a chamber within the main body extending along a part of the first height, a part of the width, and a part of the length, the chamber communicating with the top surface through an opening, the chamber communicating with the interior surface through one or more ducts,
        the main body sized and shaped to be received in a first cavity of the plurality of cavities of the acoustic liner to form a first acoustic resonator, the chamber comprising an upstream volume of the first acoustic resonator and the one or more ducts communicating with a downstream volume of the first acoustic resonator when the first modular damper plug is received in the first cavity.

2. The system of claim 1, wherein the main body of the first modular damper plug is shaped and sized to be received in a second cavity of the plurality of cavities of the acoustic liner.

3. The system of claim 2, wherein the first modular damper plug is received in the first cavity or the second cavity.

4. The system of claim 2, wherein the first cavity and the second cavity are identical.

5. The system of claim 1, wherein the main body of the first modular damper plug is shaped and sized to be received in any one of the plurality of cavities of the acoustic liner.

6. The system of claim 1, wherein the acoustic liner further comprises a first purge channel configured to communicate with a manifold of a rocket engine and the first cavity.

7. The system of claim 6, wherein the opening in the top surface of the first modular damper plug comprises an indented portion located opposite the interior surface, and wherein the indented portion is in direct fluidic communication with the first purge channel when the first modular damper plug is received in the first cavity.

8. The system of claim 7, further comprising a second modular damper plug having a length that is greater than the length of the first modular damper plug, wherein the opening in the top surface of the second modular damper plug does not comprise an indented portion located opposite the interior surface, wherein the acoustic liner further comprises a second purge channel configured to communicate with the manifold of the rocket engine and a second cavity of the plurality of cavities, and wherein the chamber of the second modular damper plug is in direct fluidic communication with the second purge channel when the second modular damper plug is received in the second cavity.

9. The system of claim 1, wherein, when the first modular damper plug is received in the first cavity, axes of the one or more ducts of the first modular damper plug are spaced from axes of one or more orifices by a distance measured along a longitudinal axis of the acoustic liner.

10. A system comprising:
an acoustic liner comprising a plurality of cavities;
a first modular damper plug comprising
a main body comprising a top surface spaced from a bottom surface by a first height, a left surface spaced from a right surface by a width, and an exterior surface spaced from an interior surface by a length, and
a chamber within the main body extending along a part of the first height, a part of the width, and a part of the length, the chamber communicating with the top surface through an opening, the chamber communicating with the interior surface through one or more ducts,
the main body sized and shaped to be received in a first cavity of the plurality of cavities of the acoustic liner to form a first acoustic resonator, the chamber comprising an upstream volume of the first acoustic resonator and the one or more ducts communicating with a downstream volume of the first acoustic resonator when the first modular damper plug is received in the first cavity; and
a second modular damper plug comprising
a main body comprising a top surface spaced from a bottom surface by a first height, a left surface spaced from a right surface by a width, and an exterior surface spaced from an interior surface by a length, and
a chamber within the main body extending along a part of the first height, a part of the width, and a part of the length, the chamber communicating with the top surface through an opening, the chamber communicating with the interior surface through one or more ducts,
the main body sized and shaped to be received in a second cavity of the plurality of cavities of the acoustic liner to form a second acoustic resonator, the chamber comprising an upstream volume of the second acoustic resonator and the one or more ducts communicating with a downstream volume of the second acoustic resonator when the second modular damper plug is received in the second cavity.

11. The system of claim 10, wherein a volume of the chamber of the first modular damper plug is greater than a volume of the chamber of the second modular damper plug.

12. The system of claim 10, wherein the second modular damper plug has a length that is greater than the length of the first modular damper plug.

13. The system of claim 12, further comprising a plurality of first modular damper plugs and a plurality of second modular damper plugs.

14. The system of claim 12, wherein the main body of the second modular damper plug is sized and shaped to be received in the first cavity of the plurality of cavities of the acoustic liner.

15. The system of claim 12, wherein the first modular damper plug is received in the first cavity to form a first acoustic resonator having a first downstream volume, and wherein the second modular damper plug is received in the second cavity to form a second acoustic resonator having a second downstream volume that is less than the first downstream volume of the first acoustic resonator.

16. The system of claim 15, further comprising a third modular damper plug having a length that is greater than the length of the second modular damper plug, the third modular damper plug received in a third cavity of the plurality of cavities to form a third acoustic resonator having a third downstream volume that is less than the second downstream volume of the second acoustic resonator.

17. The system of claim 16, wherein a volume of the chamber of the first modular damper plug is greater than a volume of the chamber of the second modular damper plug, and wherein the volume of the chamber of the second modular damper plug is greater than a volume of the chamber of the third modular damper plug.

18. The system of claim 16, wherein the first acoustic resonator is configured to target a first range of frequencies, the second acoustic resonator is configured to target a second range of frequencies that at least partially overlaps the first range of frequencies, and the third acoustic resonator is configured to target a third range of frequencies that at least partially overlaps the second range of frequencies.

19. The system of claim 16, wherein the first acoustic resonator has an upstream volume of about 0.09 $in^3$ and a downstream volume of about 0.37 $in^3$, the second acoustic resonator has an upstream volume of about 0.06 $in^3$ and a downstream volume of about 0.29 $in^3$, and the third acoustic resonator has an upstream volume of about 0.03 $in^3$ and a downstream volume of about 0.22 $in^3$.

20. The system of claim 16, wherein the plurality of cavities comprises thirty-two cavities, and wherein first modular damper plugs are received in eight of the cavities, second modular damper plugs are received in sixteen of the cavities, and third modular damper plugs are received in eight of the cavities.

* * * * *